United States Patent [19]
Omi et al.

[11] Patent Number: 5,822,635
[45] Date of Patent: Oct. 13, 1998

[54] CAMERA EQUIPPED WITH LIGHT CUTOFF DOOR OPENING AND CLOSING MECHANISM

[75] Inventors: Junichi Omi, Kawasaki; Kiyosada Machida, Urawa, both of Japan

[73] Assignee: Nikon Corporation, Tokyo, Japan

[21] Appl. No.: 932,538

[22] Filed: Sep. 17, 1997

Related U.S. Application Data

[63] Continuation of Ser. No. 634,673, Apr. 18, 1996, abandoned.

[30] Foreign Application Priority Data

Apr. 21, 1995 [JP] Japan .................................. 7-097295
Apr. 21, 1995 [JP] Japan .................................. 7-097296

[51] Int. Cl.⁶ .............................. G03B 1/00; G03B 17/00; G03B 17/26
[52] U.S. Cl. ......................... 396/411; 396/412; 396/442; 396/513
[58] Field of Search ..................................... 354/288, 275, 354/277, 174; 396/403, 411, 412, 442, 513, 514, 516, 522

[56] References Cited

U.S. PATENT DOCUMENTS

| | | | |
|---|---|---|---|
| 3,604,329 | 9/1971 | Land ............................................ 95/13 |
| 4,218,121 | 8/1980 | Nakagawa et al. ...................... 354/271 |
| 4,351,595 | 9/1982 | Date et al. ................................ 354/173 |
| 4,738,524 | 4/1988 | Liew .................................... 354/173.1 |
| 5,481,325 | 1/1996 | Wada et al. ........................... 354/173.1 |
| 5,495,310 | 2/1996 | Takatori ................................... 354/288 |
| 5,526,084 | 6/1996 | Kataoka et al. ......................... 354/275 |
| 5,604,557 | 2/1997 | Kobayashi et al. ..................... 396/538 |

FOREIGN PATENT DOCUMENTS

| | | |
|---|---|---|
| 4-343353 | 11/1992 | Japan . |
| 7-43808 | 2/1995 | Japan . |
| 7-43812 | 2/1995 | Japan . |
| 7-114098 | 5/1995 | Japan . |
| 7-199305 | 8/1995 | Japan . |
| 7-270903 | 10/1995 | Japan . |

*Primary Examiner*—Safet Metjahic
*Assistant Examiner*—Christopher Mahoney
*Attorney, Agent, or Firm*—Oliff & Berridge, PLC.

[57] ABSTRACT

In a camera, there is a requirement for ensuring the timing of opening and closing a film cartridge light cutoff door when a cartridge chamber lid is opened and closed, and moreover for lightening the operational force for opening and closing the cartridge chamber lid. In view of these requirements, the camera according to the present invention includes a cartridge chamber into which a film cartridge which comprises a light cutoff door is loaded, a cartridge chamber lid which is selectively opened and closed so as respectively to communicate the cartridge chamber to the exterior or to isolate the cartridge chamber from external light, and a door opening and closing mechanism which exerts opening driving force upon the light cutoff door so as to open it, after the cartridge chamber has been isolated from external light by closing operation of the cartridge chamber lid. Preferably, the door opening and closing mechanism comprises an energy storage mechanism which stores energy from the cartridge chamber closing operation in order to open the light shielding door of the cartridge. The opening of the light cutoff door is started only after the cartridge chamber has been isolated from external light by closing operation of the cartridge chamber lid.

20 Claims, 15 Drawing Sheets

CAMERA EQUIPPED WITH LIGHT CUTOFF DOOR OPENING AND CLOSING MECHANISM

This is a Continuation of application Ser. No. 08/634,673 filed Apr. 18, 1996 now abandoned.

BACKGROUND OF THE INVENTION

1. Field of the Invention

The present invention relates to a camera having a mechanism for opening and closing a light cutoff door of a film cartridge which is loaded into the camera, in order to prevent light from leaking into the film cartridge.

2. Description of the Related Art

A film cartridge has been previously proposed which is equipped with a light cutoff door (for example, a door which is opened and closed by being rotated) for intercepting light which would otherwise enter into the film cartridge through an aperture provided for projecting the film out from the cartridge. Such a light cutoff door needs to be driven by a light cutoff door opening and closing mechanism, so as to be moved to its open state when the film cartridge is loaded into a film cartridge chamber of the camera and the film is to be forwarded from inside the cartridge to the outside thereof for photography, while it is to be moved to its closed state when the film cartridge is to be removed from the cartridge chamber of the camera, in order to prevent light from entering into the film cartridge and being incident upon the film. Since it is necessary to close a lid provided to the cartridge chamber when the light cutoff door is in its opened state, while it is necessary to put the light cutoff door into its closed state when this cartridge chamber lid is open, various types of device have been proposed for linking the operation of opening and closing the film cartridge light cutoff door to the operation of opening and closing this cartridge chamber lid.

In, for example, Japanese Patent Laying-Open Publication No. 7 (1995)-43808 and Japanese Patent Laying-Open Publication No. 7 (1995)-43812, there is disclosed a device which opens and closes the light cutoff door by electrical action, in such as manner as, when the cartridge chamber lid is closed, to open the light cutoff door by the operation of a means for forwarding the film.

However, the device described in the above Japanese Patent Laying-Open Publications Nos. 7 (1995)-43808 and 7 (1995)-43812 is one which performs opening and closing of the light cutoff door of the film cartridge by operating the means which forwards the film, and, since an electrical means is required for controlling this film forwarding means in order to make it open the light cutoff door when it is detected that the cartridge chamber lid is closed, the construction of the camera becomes more complicated due to the provision of the light cutoff door opening and closing device, and also the cost increases undesirably.

Further, if the opening operation of the cartridge chamber lid and the closing operation of the light cutoff door are mechanically linked to the operation of an operation knob for opening and closing the cartridge chamber lid, a complicated timing mechanism comes to be required for ensuring that the opening of the cartridge chamber lid takes place only after the light cutoff door has been closed. Further, not only it is necessary for the drive mechanism for the light cutoff door to be biased by a toggle spring due to the requirement for reliably maintaining the light cutoff door both in its open position and also in its closed position, but it is also necessary to exert a locking spring force upon the cartridge chamber lid lock mechanism in order to ensure that the locking of the cartridge chamber lid in its closed position is reliable. For this reason, it is necessary to operate the operation knob against the resistance of both of these spring forces when a camera provided with a light cutoff door opening and closing construction, which can ensure proper mutual timing of the opening and closing of a film cartridge chamber closing the film cartridge chamber lid, which causes the force required for this operation to be extremely great.

SUMMARY OF THE INVENTION

A primary objective of the present invention is to provide a camera having a light cutoff door opening and closing mechanism which ensures that a cartridge chamber lid opens and closes in synchronization with a light cutoff door.

A second objective of the present invention is to provide a camera having a light cutoff door opening and closing mechanism, with which the operation force which is required for opening and closing the cartridge chamber lid is reduced.

A third objective of the present invention is to provide a camera having a light cutoff door opening and closing mechanism, which is simple in construction and low in cost.

A fourth objective of the present invention is to provide a camera having a light cutoff door opening and closing mechanism, with which the operation force which is required for opening and closing the light cutoff door can be reduced.

In order to attain these objectives, the present invention provides, a camera equipped with a light cutoff door opening and closing mechanism, comprising: a cartridge chamber wherein a film cartridge which comprises a light cutoff door is loaded thereinto; a cartridge chamber lid which is selectively opened and closed, so as respectively to communicate the cartridge chamber to the exterior or to isolate the cartridge chamber from external light; and a door opening and closing mechanism which exerts opening driving force upon the light cutoff door so as to open it, after the cartridge chamber has been isolated from external light by closing operation of the cartridge chamber lid.

And, in order to attain these objectives, the present invention provides, a camera equipped with a light cutoff door opening and closing mechanism, comprising: a cartridge chamber into which a film cartridge which comprises a light cutoff door is loaded; a cartridge chamber lid which is selectively opened and closed, so as respectively to communicate the cartridge chamber to the exterior or to isolate the cartridge chamber from external light, and which is locked in its closed position; an operation member which is operated to open the cartridge chamber lid; and a timing mechanism which, in response to the operation of the operation member to open the cartridge chamber lid, releases the closed lock of the cartridge chamber lid after the light cutoff door has been closed.

And, in order to attain these objectives, the present invention further provides, a camera equipped with a light cutoff door opening and closing mechanism, comprising: a cartridge chamber into which a film cartridge which comprises a light cutoff door is loaded; a cartridge chamber lid which is selectively opened and closed, so as respectively to communicate the cartridge chamber to the exterior or to isolate the cartridge chamber from external light; and an energy storage mechanism which is charged with opening driving force for the light cutoff door by closing operation of the cartridge chamber lid.

And, in order to attain these objectives, the present invention further provides, a camera equipped with a light cutoff door opening and closing mechanism, comprising: a cartridge chamber into which a film cartridge which comprises a light cutoff door is loaded; a cartridge chamber lid which is selectively opened and closed, so as respectively to communicate the cartridge chamber to the exterior or to isolate the cartridge chamber from external light; and an energy storage mechanism which is charged with closing driving force for the light cutoff door by closing operation of the cartridge chamber lid.

And, in order to attain these objectives, the present invention further provides, a camera equipped with a light cutoff door opening and closing mechanism, comprising: a cartridge chamber into which a film cartridge which comprises a light cutoff door is loaded; a cartridge chamber lid which is selectively opened and closed, so as respectively to communicate the cartridge chamber to the exterior or to isolate the cartridge chamber from external light; and an energy storage mechanism which is charged with opening driving force and also with closing driving force for the light cutoff door by closing operation of the cartridge chamber lid.

And, in order to attain these objectives, the present invention further provides, a camera equipped with a light cutoff door opening and closing mechanism, comprising: a cartridge chamber into which a film cartridge which comprises a light cutoff door is loaded; a cartridge chamber lid which is selectively opened and closed, so as respectively to communicate the cartridge chamber to the exterior or to isolate the cartridge chamber from external light; and an energy storage mechanism which is charged with opening driving force for the light cutoff door by opening operation of the cartridge chamber lid.

And, in order to attain these objectives, the present invention further provides, a camera equipped with a light cutoff door opening and closing mechanism, comprising: a cartridge chamber into which a film cartridge which comprises a light cutoff door is loaded; a cartridge chamber lid which is selectively opened and closed, so as respectively to communicate the cartridge chamber to the exterior or to isolate the cartridge chamber from external light; and an energy storage mechanism which is charged with closing driving force for the light cutoff door by opening operation of the cartridge chamber lid.

And, in order to attain these objectives, the present invention further provides, a camera equipped with a light cutoff door opening and closing mechanism, comprising: a cartridge chamber into which a film cartridge which comprises a light cutoff door is loaded; a cartridge chamber lid which is selectively opened and closed, so as respectively to communicate the cartridge chamber to the exterior or to isolate the cartridge chamber from external light; and an energy storage mechanism which is charged with opening driving force and also with closing driving force for the light cutoff door by opening operation of the cartridge chamber lid.

And, in order to attain these objectives, the present invention further provides, a camera equipped with a light cutoff door opening and closing mechanism, comprising: a cartridge chamber into which a film cartridge which comprises a light cutoff door is loaded; a cartridge chamber lid which is selectively opened and closed, so as respectively to communicate the cartridge chamber to the exterior or to isolate the cartridge chamber from external light; and a door opening and closing mechanism which opens the light cutoff door in mechanical response to closing operation of the cartridge chamber lid, and closes the light cutoff door in mechanical response to opening operation of the cartridge chamber lid.

According to the present invention of described above, the door opening and closing mechanism first exerts opening driving force upon the light cutoff door so as to open it, after the cartridge chamber has been isolated from external light by closing operation of the cartridge chamber lid, whereby, the light cutoff door is opened only after the cartridge chamber has been completely isolated from external light.

According to the present invention of described above, the timing mechanism, in response to the operation of the operation member to open the cartridge chamber lid, first drives the light cutoff door to close it, and thereafter releases the closed lock of the cartridge chamber lid.

According to the present invention described above, the energy storage mechanism is charged with opening driving force for the light cutoff door by closing operation of the cartridge chamber lid.

According to the present invention described above, the energy storage mechanism is charged with closing driving force for the light cutoff door by closing operation of the cartridge chamber lid.

According to the present invention described above, the energy storage mechanism is charged with opening driving force and also with closing driving force for the light cutoff door by closing operation of the cartridge chamber lid.

According to the present invention described above, the energy storage mechanism is charged with opening driving force for the light cutoff door by opening operation of the cartridge chamber lid.

According to the present invention described above, the energy storage mechanism is charged with closing driving force for the light cutoff door by opening operation of the cartridge chamber lid.

According to the present invention described above, the energy storage mechanism is charged with opening driving force and also with closing driving force for said light cutoff door by opening operation of said cartridge chamber lid.

According to the present invention described above, when the cartridge chamber lid is opened or closed, the door opening and closing mechanism respectively closes or opens the cartridge chamber lid in mechanical response to this opening or closing operation.

According to these various aspects of the present invention as described above, the following advantages are obtained:

(1) It can be ensured that the light cutoff door is only opened after the cartridge chamber lid is closed and the cartridge chamber is protected against the entry of light.

(2) Since the mechanism arranges for opening driving force and/or closing driving force for the light cutoff door to be stored up by the cartridge chamber lid being driven to close and/or to open, it is possible to reduce the amount of driving force required to open and/or close the cartridge chamber lid.

(3) Since the mechanism arranges, in the initial stage of opening operation of the cartridge chamber lid, for the locking of the cartridge chamber lid to be released only after the light cutoff door is closed, whereby when the film cartridge chamber lid is to be opened, there is no danger of it happening that this cartridge chamber lid should be released before the light cutoff door is fully closed, and undesired exposure of the film is prevented.

(4) Since the force which the photographer is required to input for closing and opening the cartridge chamber lid is relatively light, it is possible to increase the amount of force which is accumulated for opening and closing the light cutoff door, while still keeping the operation force small.

(5) Since the mechanism arranges for the light cutoff door opening and closing mechanism to be driven mechanically in response to the opening and closing operation of the film cartridge chamber lid, thereby it is possible to open and close the light cutoff door of the film cartridge only by opening and closing the cartridge chamber lid. And accordingly no electrically powered means is required for opening and closing the light cutoff door, and the camera can be constructed simply, and also can be cheap.

(6) Since the light cutoff member cuts off light from the cartridge chamber until the light cutoff door is completely closed, external light is prevented from getting into the cartridge chamber until the cartridge chamber lid is completely opened. Therefore, it never happens that the film is sensitized by light entering into the film cartridge through the aperture via which the film is projected, partway through the operation of opening the film cartridge chamber lid.

(7) Since the light cutoff door is completely closed until the cartridge chamber lid starts to prevent light from entering into the cartridge chamber by the light cutoff member, thereby it never happens that the film is sensitized by light entering into the film cartridge through the aperture via which the film is projected, partway through the operation of closing the film cartridge chamber lid.

(8) Since the construction arranges for supplementation of the driving of the door opening and closing mechanism by the supplementary member in response to the closing operation of the cartridge chamber lid, thereby it is possible to reduce the amount of operation force when closing the cartridge chamber lid and driving the door opening and closing mechanism. Accordingly, the amount of operating force for the door opening and closing mechanism can also be reduced, so that it is possible to perform the opening and closing operation of the cartridge chamber lid smoothly. Further, since it is possible to reduce the amount of force of the springs and the like which drive the door opening and closing mechanism, the construction of the door opening and closing mechanism also becomes simple, and the camera can be made even more compact.

(9) Since the door opening and closing mechanism is made from engagement members and drive members, it becomes easy to match the timing of opening the cartridge chamber lid and the timing of closing the light cutoff door, and the timing of closing the cartridge chamber lid and the timing of opening the light cutoff door. Accordingly, it becomes easy to control the door opening and closing construction so as to completely close the light cutoff door of the film cartridge before the cartridge chamber lid is completely opened, and thereby it is positively prevented that the film should become exposed to light when the film cartridge is being removed from the film cartridge chamber.

DETAILED DESCRIPTION OF THE PREFERRED EMBODIMENTS

Preferred Embodiment 1

Figure 1:
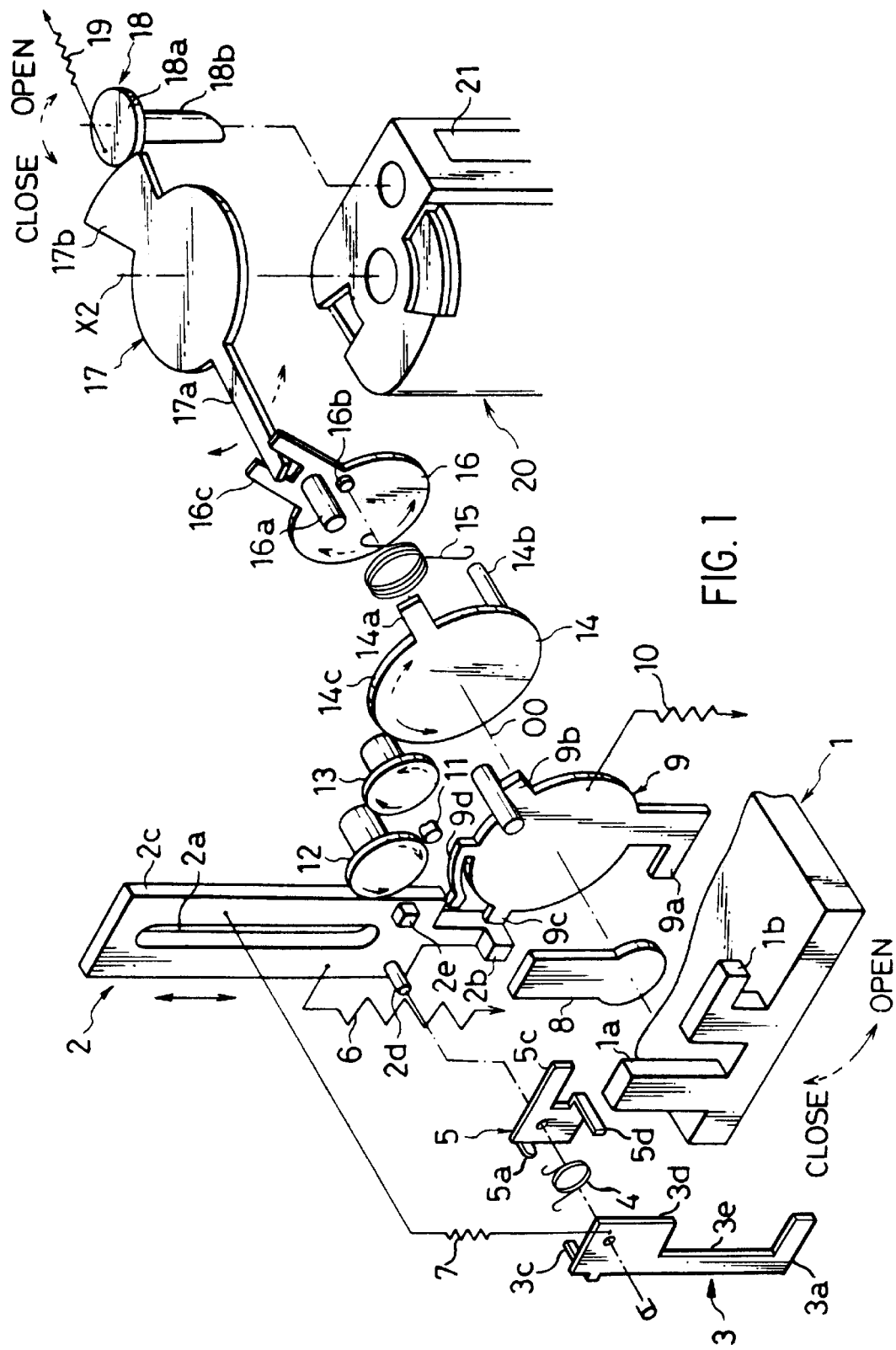
FIG. 1 is an exploded perspective view showing a first preferred embodiment of the camera equipped with light cutoff door opening and closing mechanism of the present invention.

The first preferred embodiment of the camera equipped with light cutoff door opening and closing mechanism of the present invention will now be explained with reference to FIGS. 1 through 3. A light cutoff door 21 of a film cartridge 20 which is loaded in a cartridge chamber which is provided in a camera main body not shown in the figure is closed when the cartridge 20 is not loaded into the camera in order to reliably prevent light entering into the cartridge 20 and exposing the film therein, while it is opened when the cartridge 20 is loaded into the camera in order to allow the film to be projected out from the cartridge 20. FIG. 1 is an exploded perspective view showing the detailed construction of an opening and closing mechanism for a lid 1 of the film cartridge chamber and of an opening and closing mechanism for the light cutoff door 21, and shows these mechanisms in their states when the cartridge chamber lid 1 is in its closed state while the light cutoff door 21 of the cartridge 20 is in its open state.

A driver 18 for the light cutoff door 21 comprises a gear 18a and a drive shaft 18b. The drive shaft 18b is inserted from the upper end of the film cartridge 20 into the interior thereof and is engaged therein with a light cutoff door opening and closing mechanism within the cartridge. When the cartridge chamber lid 1 is operated so as to open it, the gear 18a is rotated in the anticlockwise rotational direction and closes the light cutoff door 21. On the other hand, when the cartridge chamber lid 1 is operated so as to close it, the gear 18a is rotated in the clockwise rotational direction and opens the light cutoff door 21. A toggle spring 19 is fitted to the driver 18 for holding the light cutoff door 21 and the driver 18 in their positions with a predetermined toggle force when the light cutoff door 21 has been operated so as to be positioned to its open position or to its closed position.

A rotation coupling plate 17 rotates about the same central axis X2 as does the spool of the film cartridge 20, and comprises on its one side an arm 17a and on its other side a sector gear 17b. The sector gear 17b of the rotation coupling plate 17 is meshed into the gear 18a, while the arm 17a of the rotation coupling plate 17 is engaged into a fork 16b of a fork plate 16. A boss 16a and a spring engagement shaft 16b protrude from the fork plate 16, and a torsion spring 15 is interposed between the spring engagement shaft 16b and a spring engagement shaft 14b of a rotatable disk 14 which will be described hereinafter. The biasing force of the torsion spring 15 is greater than the biasing force (the toggling force) of the toggle spring 19. This torsion spring 15 is flexed by the rotation of the rotatable disk 14 in the clockwise rotational direction when the cartridge chamber lid 1 is operated so as to be closed, and is thereby tensioned for subsequently opening the light cutoff door 21 of the film cartridge; and then, after the closing of the cartridge chamber lid 1 has been completed so that its action for light cutoff is assured, the torsion spring 15 drives the fork plate 16 by this tension force in the clockwise rotational direction, so as to open the light cutoff door 21.

When the cartridge chamber lid 1 is to be opened, an actuation lever 8 is operated so as to rotate in the anticlockwise rotational direction around an axis O0, and a lock lever 9 rotates together with the actuation lever 8. The lock lever 9 is supported so as to be rotatable around the axis O0, and is biased in the clockwise rotational direction by a spring 10. A stop claw 9a is provided to the lock lever 9 and, when the cartridge chamber lid 1 is in its closed position, the slop claw 9a is engaged with a claw 1b of the cartridge chamber lid 1.

The cartridge chamber lid 1 can be opened or closed by being rotated in the directions of the arrows in FIG. 1 around a hinge which is not shown in the figure, and, in its state shown in FIG. 1, the stop claw 1b provided on the inner side of the cartridge chamber lid 1 is engaged with the stop claw 9a of the lock lever 9 and keeps the cartridge chamber lid 1 in its closed state. When the photographer operates the actuation lever 8 so as to rotate it in its anticlockwise rotational direction, the lock lever 9 is likewise rotated in the anticlockwise rotational direction so as to disengage its stop claw 9a from the stop claw 1b, whereby the cartridge chamber lid 1 is released so that it can be opened.

A rotatable latch arm 9d is provided as extending from a point upon the periphery of the lock lever 9 and extending around this periphery for a certain distance. This latch arm 9d is disengaged from a latch shaft 11 which projects from the main body (not shown) of the camera when bent outwards in the radial direction of the lock lever 9. When the cartridge chamber lid 1 is open, as shown in FIG. 3, the latch shaft 11 is engaged with the latch arm 9d and restrains the lock lever 9 from being biased in its clockwise rotational direction, and the lock lever 9 is kept in its open position thereby. When the cartridge chamber lid 1 is operated so as to be opened, a projection 9c pushes upon an arm 5c of a lever 5 which will be described hereinafter and rotationally drives the lever 5 in the clockwise rotational direction thereby. A stop member 9b is engaged with the boss 16a of the fork plate 16 mentioned above, and stops the rotational biasing force in the clockwise rotational direction of the fork plate 16 by the spring 15, so as to keep the light cutoff door 21 in its closed state until the cartridge chamber lid 1 is preventing light from entering the cartridge chamber.

A rack 2c is formed upon a side face of a rack plate 2 and a guide pin 81 which projects from the main body of the camera (not shown) is inserted into a guide slot 2a cut in this rack plate 2, so that the plate 2 moves in the up and down direction as shown in FIG. 1 as the guide pin 81 slides along the slot 2a. This rack plate 2 is biased in the downwards direction in the figure by the spring force of a spring 6 which is tensioned by the closing operation of the cartridge chamber lid 1. The force of the spring 6 which biases the rack plate 2 in the downward direction is substantially greater than the spring force of the toggle spring 19 which maintains the open or closed position of the light cutoff door 21. A shaft 2d projects from the lower end portion of the rack plate 2, and the lever 5 and a lever 3 are mounted upon this shaft 2d so as to be rotatable thereon. A torsion spring 4 is interposed between a spring attachment arm 3c of the lever 3 and a spring attachment arm 5a of the lever 5, and biases the lever 5 in the clockwise rotational direction while it biases the lever 3 in the anticlockwise rotational direction, so that an arm 5d of the lever 5 is contacted against a face 3d of the lever 3. Further, the lever 3 is also biased in its anticlockwise rotational direction by a spring 7.

Figure 2:
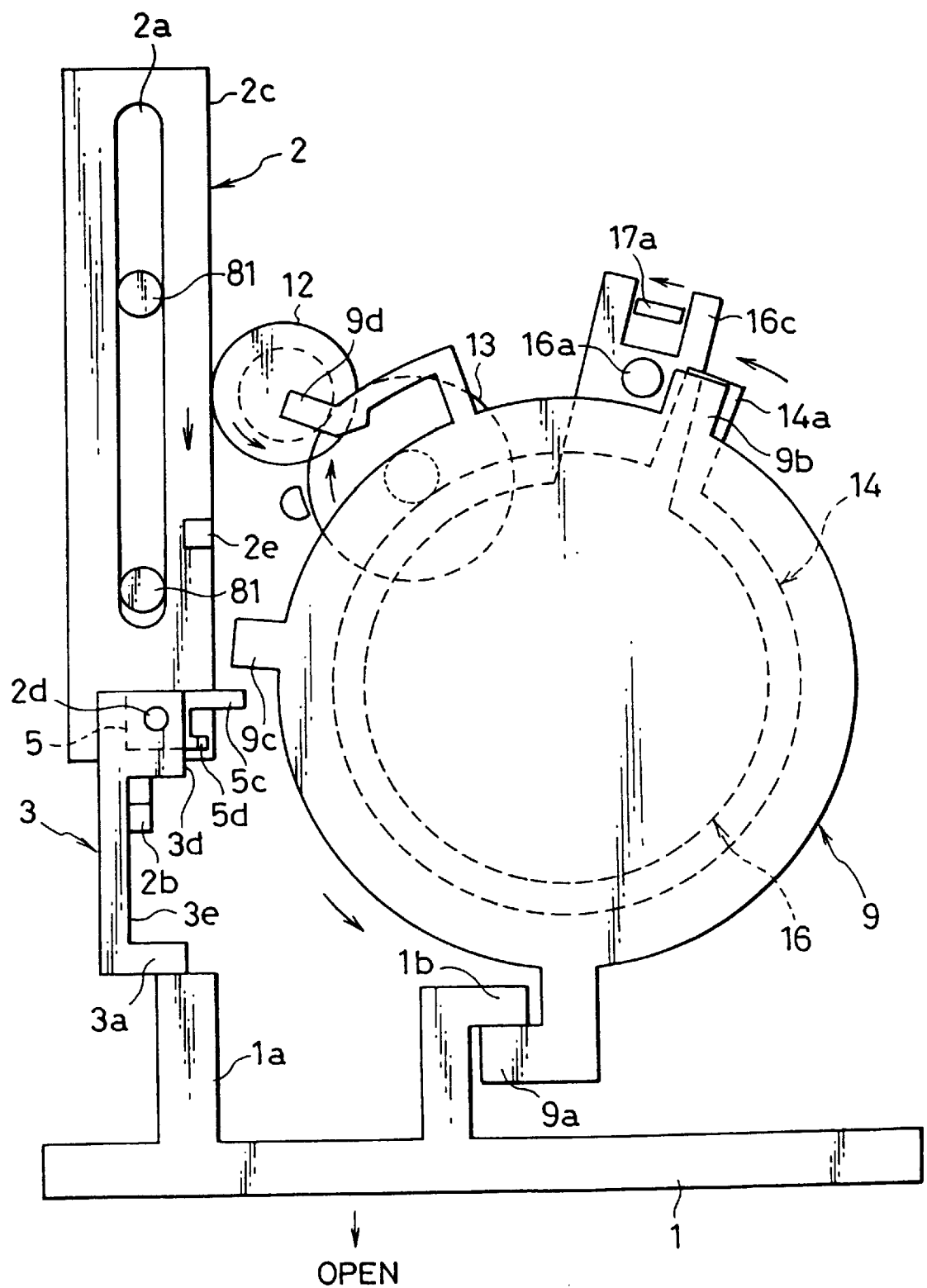
FIG. 2 is a figure showing the state when the cartridge chamber lid is closed.

When the cartridge chamber lid 1 is closed as shown in FIG. 2, a lower face of a lower end arm 3a of the lever 3 is engaged against an upper face of a projection 1a of the above described cartridge chamber lid 1, so as to limit the downward travel of the rack plate 2. When the lock lever 9 is driven in the anticlockwise rotational direction in order to open the cartridge chamber lid 1, and when the arm 5c of the lever 5 is pressed downwards by the projection 9c so that the lever 5 is driven in the clockwise rotational direction, then the arm 5d of the lever 5 presses the face 3d of the lever 3, so that the lever 3 is rotated in the clockwise rotational direction. And thereby, the engagement between the lower end arm 3a and the projection 1a is released. A projection 2b which projects from the front face of the lower end of the rack plate 2 comes into contact with a face 3e of the lever 3 and limits the rotational operation of the lever 3 in the anticlockwise rotational direction. When the rack plate 2 is raised upwards, i.e. when the cartridge chamber lid 1 is closed, a projection 2e which projects from the front face of the rack plate 2 presses the latch arm 9d of the lock lever 9 and releases the engagement together of this arm 9d and the latch shaft 11, so that the latching of the lock lever 9 is released.

The rotatable disk 14 is supported so as to be rotatable around the same axis O0 as the lock lever 9, and can be rotated separately from the lock lever 9. This rotatable disk 14, along with rotationally pressing the boss 16a in the anticlockwise rotational direction, is provided with a projection 14a for withstanding the biasing force in the clockwise rotational direction of the boss 16a, a spring engagement projection 14b for engaging the torsion spring 15, and a gear 14c which is cut upon its circumferential surface. The gear 14c is meshed with a gear 13, and this gear 13 is meshed with a gear 12, which in turn is meshed with the rack 2c formed on the rack plate 2. Accordingly, when the cartridge chamber lid 1 is operated to open it and the rack plate 2 moves downwards in the figures, the rotatable disk 14 is rotated in the anticlockwise rotational direction; while, when the cartridge chamber lid 1 is operated to close it and the rack plate 2 moves upwards in the figures, the rotatable disk 14 is rotated in the clockwise rotational direction.

In the following, the opening and closing operation of the cartridge chamber lid 1 and the opening and closing of the light cutoff door 21 will be explained with reference to FIGS. 1 through 3. Moreover, FIG. 2 shows the state when the cartridge chamber lid 1 is closed, while FIG. 3 shows the state when the cartridge chamber lid 1 is open.

(1) Operation to open the cartridge chamber lid 1

(a) When from the state in which the cartridge chamber lid 1 is closed the actuation lever 8 is operated so as to be turned in the anticlockwise rotational direction, the lock lever 9 is also rotated in the same direction. Just before the engagement between the stop claw 1b and the stop claw 9a is broken, the projection 9c of the lock lever 9 pushes the arm 5c of the lever 5 downwards, and again the arm 5d presses against the face 3d of the lever 3 so as to rotate the lever 3 in the clockwise rotational direction.

(b) In accordance with the driving of the lever 3 in the clockwise rotational direction, the engagement between the lower end arm 3a of the lever 3 and the projection 1a is broken, and the rack plate 2 starts to be moved downward by the biasing force of the spring 6.

(c) When the rack plate 2 moves downwards, the rotatable disk 14 is rotated in the anticlockwise rotational direction via the gears 12 and 13, and the projection 14a of the rotatable disk 14 rotates the fork plate 16 in the anticlockwise rotational direction via the boss 16a, so that the rotation coupling plate 17 is rotated in the clockwise rotational direction via its arm 17a, and, finally, the light cutoff door driver 18 is rotated in the anticlockwise rotational direction, so as to close the light cutoff door 21. Moreover, when the lock lever 9 is rotated in the anticlockwise rotational direction by the operation of the actuation lever 8 in the anticlockwise rotational direction, since the projection 9b and the boss 16a first come into contact at a timing directly before the engagement between the stop claw 1b and the stop claw 9a is broken, closing operation of the light cutoff door 21 by the lock lever 9 is not performed, and the light cutoff door 21 is operated to close according to the amount by which the fork plate 16 is rotated due to the rotatable disk 14 being rotated in the anticlockwise rotational direction by the lowering of the rack plate 2.

(d) Thereafter, the stop claw 1b and the stop claw 9a are separated, and the cartridge chamber lid 1 is opened.

(e) When again the lock lever 9 is rotated in the anticlockwise rotational direction, the latch arm 9d and the latch shaft 11 are engaged together, and the lock lever 9 is latched in the cartridge chamber lid 1 open state.

Figure 3:
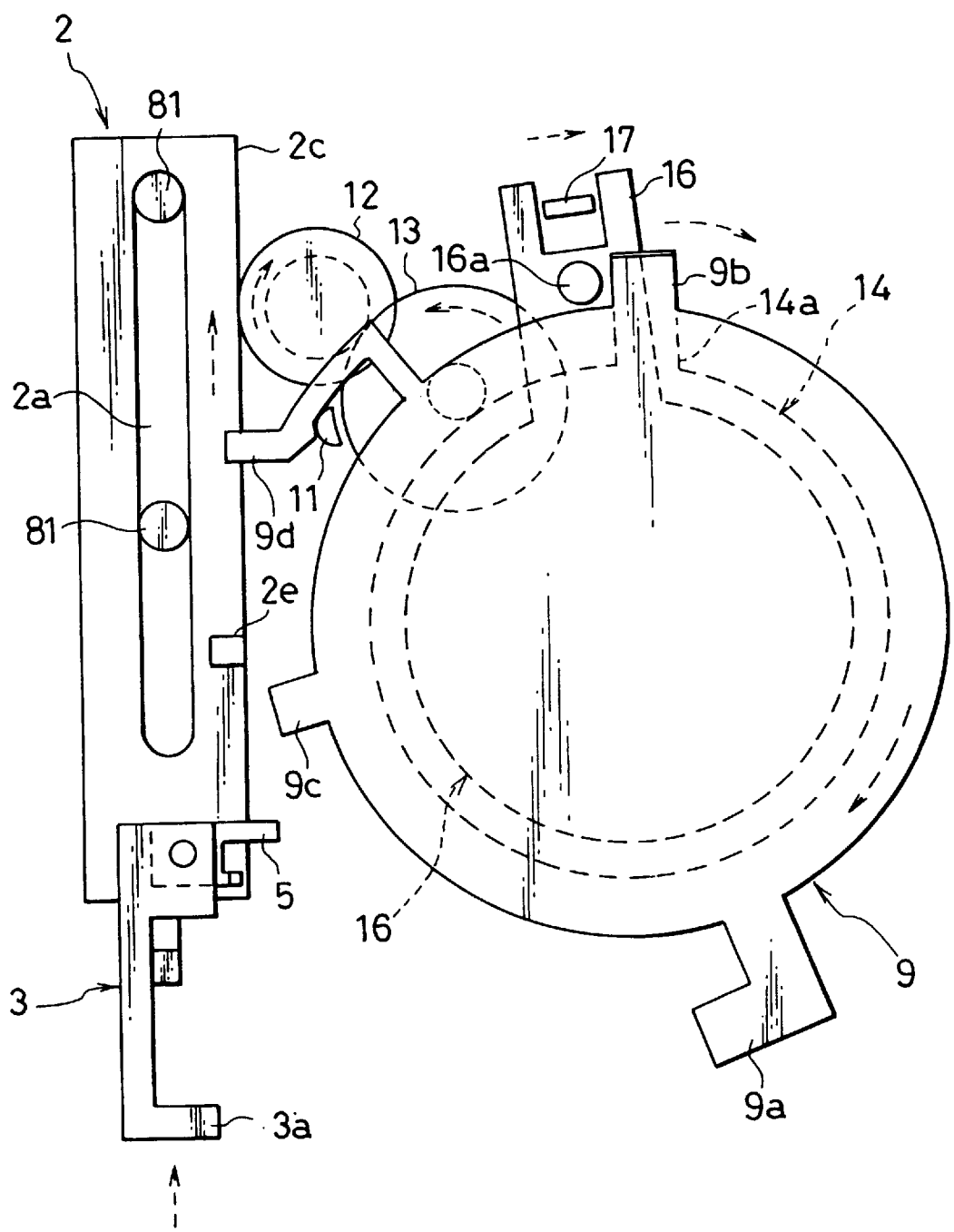
FIG. 3 is a figure showing the state when the cartridge chamber lid is open.

As described above, when the opening of the cartridge chamber lid 1 has been completed, the various elements are in their states as shown in FIG. 3, with the rotational biasing force in the clockwise direction which is exerted by the spring 10 of the lock lever 9 restrained by the shaft 11 due to the latch arm 9d, and further the driver 18 for the light cutoff door 21 is maintained in the door closed position by the toggle spring 19 when the cartridge chamber lid 1 is open. Accordingly, the driver 18 for the light cutoff door 21 is correctly engaged with the light cutoff door opening and closing mechanism for the cartridge chamber lid 1 when a film cartridge 20 is reloaded, and opening operation of the light cutoff door 21 can be accurately performed upon the closing of the cartridge chamber lid 1.

(2) Operation to close the cartridge chamber lid 1

(a) When the cartridge chamber lid 1 not shown in the figure is rotated in the closing direction from the state shown in FIG. 3 in which this cartridge chamber lid is open, first the projection 1a and the lower end arm 3a of the lever 3 come into contact.

(b) When the closing of the cartridge chamber lid 1 is continued, the rack plate 2 tensions the spring 6 while rising upwards, and the rotatable disk 14 is rotated in the clockwise rotational direction by the gears 12 and 13.

(c) The fork plate 16 cannot rotate due to the projection 9b of the lock lever 9 which is rotationally latched, and the spring 15 is wound up thereby.

(d) When the cartridge chamber lid 1 is closed so that the cartridge chamber not shown in the figures is perfectly prevented from ingress of light, the projection 2e bends the arm 9d upwards so that the stopping of the latch arm 9d by the shaft 11 is released. As a result, the latching of the lock lever 9 is released, and the lock lever 9 is rotated in the clockwise rotational direction by the spring 10, so that the stop claw 9a comes to be engaged by the claw 1a of the cartridge chamber lid 1.

(e) When the lock lever 9 is rotated in the clockwise rotational direction, the stopping of the boss 16a is released, and the fork plate 16 is rotated in the clockwise rotational direction by the spring force of the spring 15.

(f) As a result, the arm 17a of the rotation coupling plate 17 is rotated in the anticlockwise rotational direction, and the driver 18 for the cartridge chamber lid 1 is driven in the clockwise rotational direction, so that the light cutoff door 21 is opened.

In the manner described above, when ingress of light into the cartridge chamber is prevented by the cartridge chamber lid 1, for the first time the opening driving force in the opening direction of the wound up spring 15 is applied to the light cutoff door 21 and opens this light cutoff door 21, so that improper exposure of the film is reliably prevented.

In accordance with the above described first preferred embodiment of the present invention, the light cutoff door 21 is driven to be opened at almost the same time as the engagement between the lock lever 9 and the cartridge chamber lid 1 is released, and in principle the light cutoff door 21 is opened from the state in which the cartridge chamber lid 1 is perfectly preventing the entry of light into the film cartridge chamber; but, if it is considered that the safety countermeasures against leaking in of light should be improved further, it would be suitable further to provide a delay mechanism such as a governor or the like for the fork plate 16, so that it would be ensured that a predetermined delay time period should elapse after the locking of the cartridge chamber lid 1 is completed before the driving of the fork plate 16 is commenced.

According to the first preferred embodiment of the present invention described above, the following advantages are obtained.

(a) Since the movement of the rack plate 2 is reduced in speed by the gears 12 and 13, it is possible to reduce the spring force for opening and closing the light cutoff door 21. In other words, the spring constant of the spring 6 can be made smaller.

(b) Since the construction is such that the opening and closing actuation lever 8 for the cartridge chamber lid 1 with its directly linked lock lever 9 and the driver 18 for the light cutoff door 21 are not directly mechanically linked together, but instead the rotatable disk 14 and the fork plate 16 are interposed therebetween, and the opening and closing driving force for the light cutoff door 21 is generated by the tension forces of the springs 6 and 15, whereby it is possible to reduce the operation force which is required for opening and closing the cartridge chamber lid 1. In other words, if the actuation lever 8 were directly connected to the driver 18 for the light cutoff door 21, it would be necessary for the door closing operation force to overcome the toggle force of the light cutoff door driver; but according to the first preferred embodiment, since the door 21 is closed by the spring force of the spring 6 which has been accumulated during the operation of closing the cartridge chamber lid 1, an operation force for the actuation lever 8 becomes small.

(c) Since the driving force for closing the light cutoff door 21 is generated by the spring 6, it is sufficient for the spring 10 to return the lock lever 9 to its original position, so that it is possible to reduce the amount of force of the spring 10, and also it is possible to reduce the operation force of the actuation lever 8 for opening the cartridge chamber lid 1 thereby. Further, it is also possible to reduce the physical size of the spring itself, and the elements to which it is affixed can also be made of a slimmed down construction, whereby it is possible to make a contribution to reduction of the size of the camera as a whole.

(d) Since it is very easy for the photographer to exert the force which is required for the operation of closing the cartridge chamber lid 1, it is possible to increase the tension force (the tension force of the springs 15 and 19) for opening and closing the light cutoff door 21 while still keeping the perceived operating force relatively small.

Preferred Embodiment 2

Figure 4:
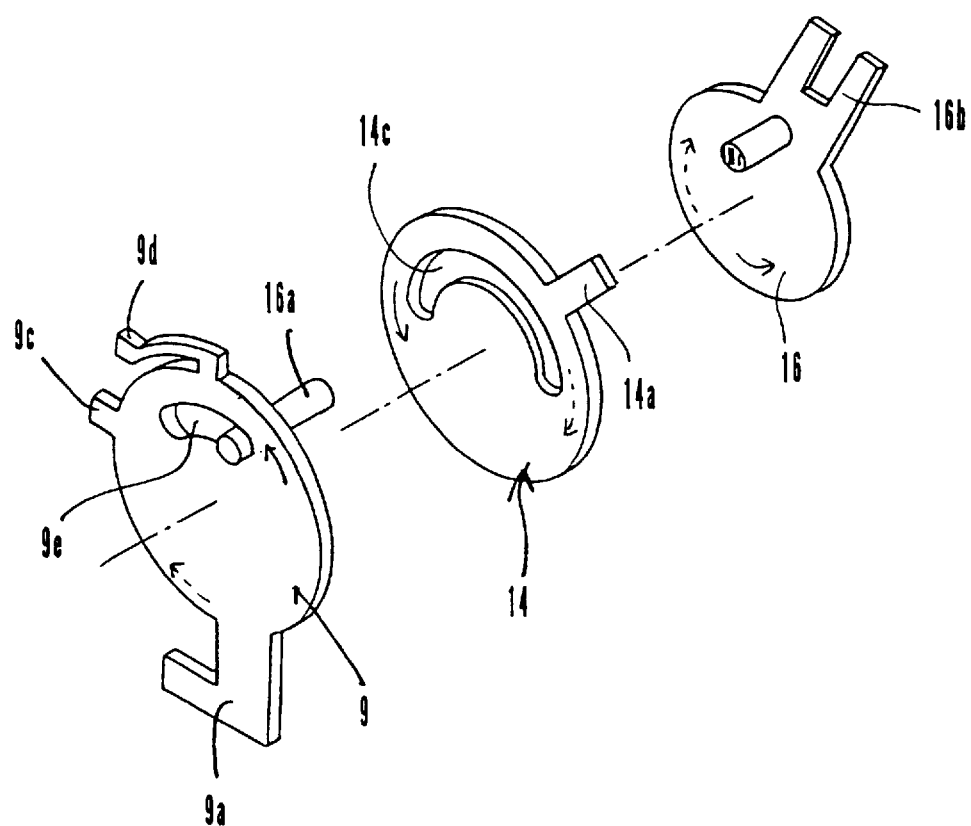
FIG. 4 is an exploded perspective view showing another possible construction for a lock lever, a rotatable disk, and a fork plate.

In the first preferred embodiment of the present invention described above, the construction ensured that the spring 6 was tensioned by the action of closing the cartridge chamber lid 1, so as to accumulate the driving force subsequently required for closing the light cutoff door 21 when opening the cartridge chamber lid 1; and in the same manner the spring 15 was also wound up so as to accumulate the driving force required for opening the light cutoff door 21 when closing the cartridge chamber lid 1. However, if only the driving force required for subsequently closing the light cutoff door 21 is accumulated during the closing movement of the cartridge chamber lid 1, it will be acceptable, for example, to construct the lock lever 9, the rotatable disk 14, and the fork plate 16 of the first preferred embodiment described above as shown in FIG. 4. The projection 9b of the lock lever 9 is omitted and instead a slot 9e is formed therein; the spring engagement shaft 14b of the rotatable disk 14 is omitted and instead a slot 14c is formed therein; and the spring engagement shaft 16b of the fork plate 16 is omitted. FIG. 4 shows the state of the parts in the locked condition when the cartridge chamber lid 1 is closed as shown in FIG. 1 for the first preferred embodiment. Apart from these matters, all the rest of the construction of this second preferred embodiment may be identical to that of the first preferred embodiment described above, and the torsion spring 15 is omitted.

If the lock lever 9 is rotated by the actuation lever 8 in the direction (the counterclockwise rotational direction) to open the cartridge chamber lid 1, in the same way as in the first preferred embodiment, when the engagement between the lower end arm 3a of the lever 3 and the projection 1a has been broken, the rack plate 2 is impelled downwards by the force of the spring 6, and the rotatable disk 14 is rotated in the anticlockwise rotational direction, so that the fork plate 16 is rotated in the anticlockwise rotational direction by the right end of the slot 14c via the boss 16a, and the light cutoff door 21 is closed by the driver 18 therefor due to the rotation of the rotation coupling plate 17 in the clockwise rotational direction. Thereafter, the stop claw 1b of the cartridge chamber lid 1 is removed from the stop claw 9a of the lock lever 9 and the locking of the cartridge chamber lid 1 is released.

On the other hand, when the cartridge chamber lid 1 is closed, while the spring 6 is tensioned the rotatable disk 14 rotates independently in the clockwise rotational direction. At this time, since the torsion spring 15 has been deleted from the construction, no process of accumulating spring force (drive force for opening the light cutoff door 21) takes place. When the latch arm 9d is bent back by the projection 2e, the lock lever 9 is rotated in the clockwise rotational direction by the spring force of its spring 10. According to the rotation of the lock lever 9, the boss 16a is driven by being pushed by the left end of the slot 9e, and the fork plate 16 is rotated in the clockwise rotational direction so as to open up the light cutoff door 21. The left end of the slot 9e pushes the boss 16a until the point at which the dead point of the spring 19 has been passed, and thereafter the boss 16a is released from the left end of the slot 9e by the spring force of the spring 19 and assumes the position shown in FIG. 4. Further, the cartridge chamber lid 1 is stopped by the engagement between the stop claw 9a and the stop claw 1b.

Preferred Embodiment 3

In the first preferred embodiment described above, the construction provided for the spring 6 to be tensioned by the closing action of the cartridge chamber lid 1 so as to accumulate drive force for closing the light cutoff door 21 when the cartridge chamber lid 1 was to be opened, and also in the same manner the torsion spring 15 was wound up in order to accumulate drive force for opening the light cutoff door 21 when the cartridge chamber lid 1 was closed. However, with regard to the first preferred embodiment in which the actuation lever 8 and the driver 18 for the cartridge chamber lid 1 were not directly mechanically linked together but instead the rotatable disk 14 and the fork plate 16 were interposed therebetween, if only drive force to open the light cutoff door 21 is exerted by the operation of closing the cartridge chamber lid 1, without tensioning the spring, then it will be acceptable to set the amount of spring force of the spring 6 of the first preferred embodiment (for example) to a value sufficient only for bringing back the rack plate 2. In this case, the closing of the light cutoff door 21 is performed by the projection 9b pushing the boss 16a due to the rotation in the anticlockwise rotational direction of the lock lever 9.

Preferred Embodiment 4

In the first through the third preferred embodiments described above, during the operation of closing the cartridge chamber lid 1, along with tensioning the spring 6 so as to accumulate driving force for closing the light cutoff door 21 when the cartridge chamber lid 1 is opened, it will be acceptable also, in the same manner, to wind up the torsion spring 15 so as to accumulate driving force for opening the light cutoff door 21 when the cartridge chamber lid 1 is closed. Accordingly, without directly mechanically linking together the actuation lever 8 and the driver 18 for the light cutoff door 21, but by interposing the rotatable disk 14 and the fork plate 16 therebetween, as in the first preferred embodiment, it will be acceptable to tension both the spring 6 and the torsion spring 15 by the operation of opening the cartridge chamber lid 1.

Figure 5:
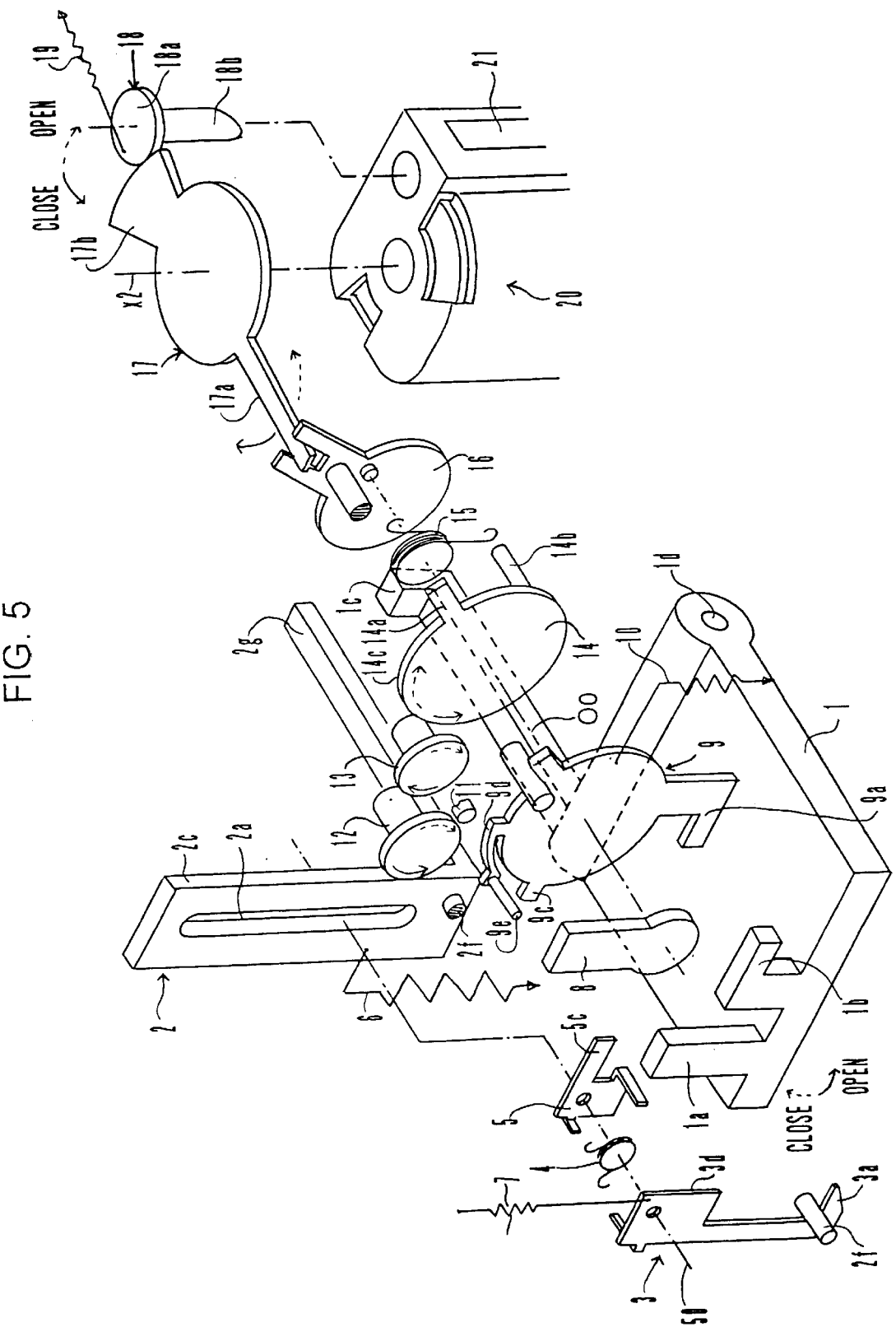
FIG. 5 is an exploded perspective view showing a fourth preferred embodiment of the camera equipped with light cut off door opening and closing mechanism of the present invention.

FIG. 5 is an exploded perspective view showing the detailed construction of an opening and closing mechanism for a lid 1 of the film cartridge chamber and of an opening and closing mechanism for the light cutoff door 21 according to the fourth preferred embodiment of the present invention. In FIG. 4, the same reference number as shown in FIG. 1 is put to the same construction as shown in FIG. 1, and the detailed description is omitted here.

In this case, a projection 1c should be provided on the edge portion of the cartridge chamber lid 1 at the opposite side from the stop claw 1b with the hinge 1d of this lid 1 therebetween, and an arm 2g should be provided on the back face of the lower end portion of the rack plate 2. When opening the cartridge chamber lid 1 the arm 2g of the rack plate 2 is pushed upwards by the action of the projection 1c, and the springs 6 and 15 are tensioned thereby. The lever 5, the lever 3 and the torsion spring 4 are mounted upon the same shaft (not shown) which projects from the camera main body. A shaft 2f projects from the lower end portion of the rack plate 2, and can be engaged with the lower end arm 3a of the lever 3. Accordingly, when the rack plate 2 is pushed upwards by the opening action of the cartridge chamber plate 1, the shaft 2f engages with the lower end arm 3a, and the rack plate 2 is latched by the lever 3. A projection 9e is provided on the top end portion of the latch arm 9d. Along with the closing operation of the cartridge chamber lid 1, after the cartridge chamber lid 1 has completely closed so as to perfect the function of preventing light from entering into the film cartridge chamber, when the projection 9e is pushed upwards by the projection 1a and the stopping of latch arm 9d by the shaft 11 is released thereby, the driving force for opening the light cutoff door 21 which has been accumulated in the torsion spring 15 is imparted and the latching of the fork plate 16 is released, and the door opening driving force is imparted by the spring 15 to the driver 18 for the light cutoff door 21, and the light cutoff door 21 is opened. As a result, the stop claw 9a comes to be engaged by the claw 1b of the cartridge chamber lid 1. In the state in which the opening of the light cutoff door 21 has been completed, the spring 6 is still tensioned as before.

Suppose that the actuation lever 8 is operated in the state with the cartridge chamber lid 1 closed, the light cutoff door 21 opens, and the spring 6 tensioned. When the lock lever 9 is rotated in the anticlockwise rotational direction and the arm 5c is pushed by the projection 9c so that the engagement between the lower end arm 3a and the shaft 2f comes to be released by the rotational movement of the lever 3 in the clockwise rotational direction, then the rack plate 2 is moved downwards by the accumulated spring force of the spring 6. According to the movement of the rack plate 2, in the same manner as described above, the light cutoff door 21 is closed before the closed lock of the cartridge chamber lid 1, that is the engagement between the claw 1b and the stop claw 9a, is released. And thereby, along with the spring 6 being again tensioned by the locking of the cartridge chamber lid 1 being released and the cartridge chamber lid 1 then being opened, the torsion spring 15 is also wound up.

Preferred Embodiment 5

Figure 15:
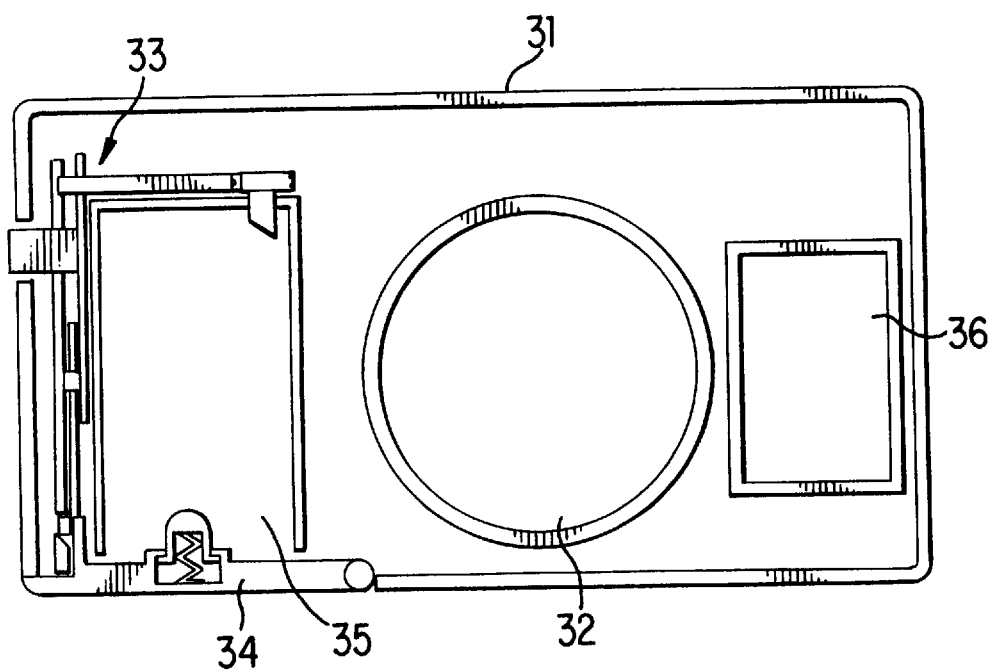
FIG. 15 is an elevation view of a camera to which the fifth preferred embodiment of the present invention is applied.

FIG. 15 is a figure showing the fifth preferred embodiment of the camera equipped with light cutoff door opening and closing mechanism of the present invention. As shown in FIG. 15, this fifth preferred embodiment camera comprises a cover 31 which constitutes the outside of the camera, a photographic lens 32, a film cartridge chamber lid opening and closing mechanism 33 which opens and closes a film cartridge chamber lid 34 along with the opening and closing of a light cutoff door (not shown in the figure) of a film cartridge, a film cartridge chamber 35 for receiving this film cartridge, and a film receiving chamber 36 for receiving the film as it is pulled out of this film cartridge.

Figure 6:
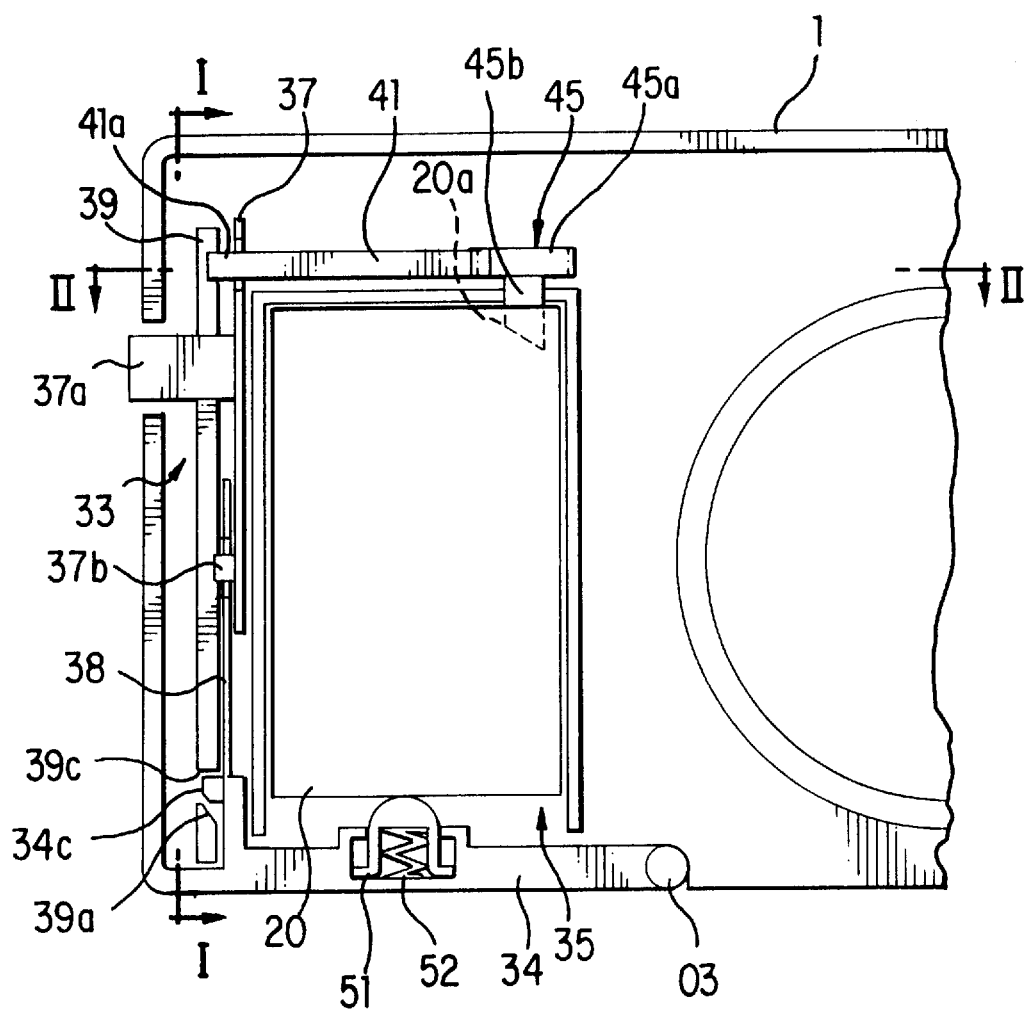
FIG. 6 is an elevation view of a camera according to a fifth preferred embodiment of the present invention, in its state in which a cartridge chamber is closed.
Figure 7:
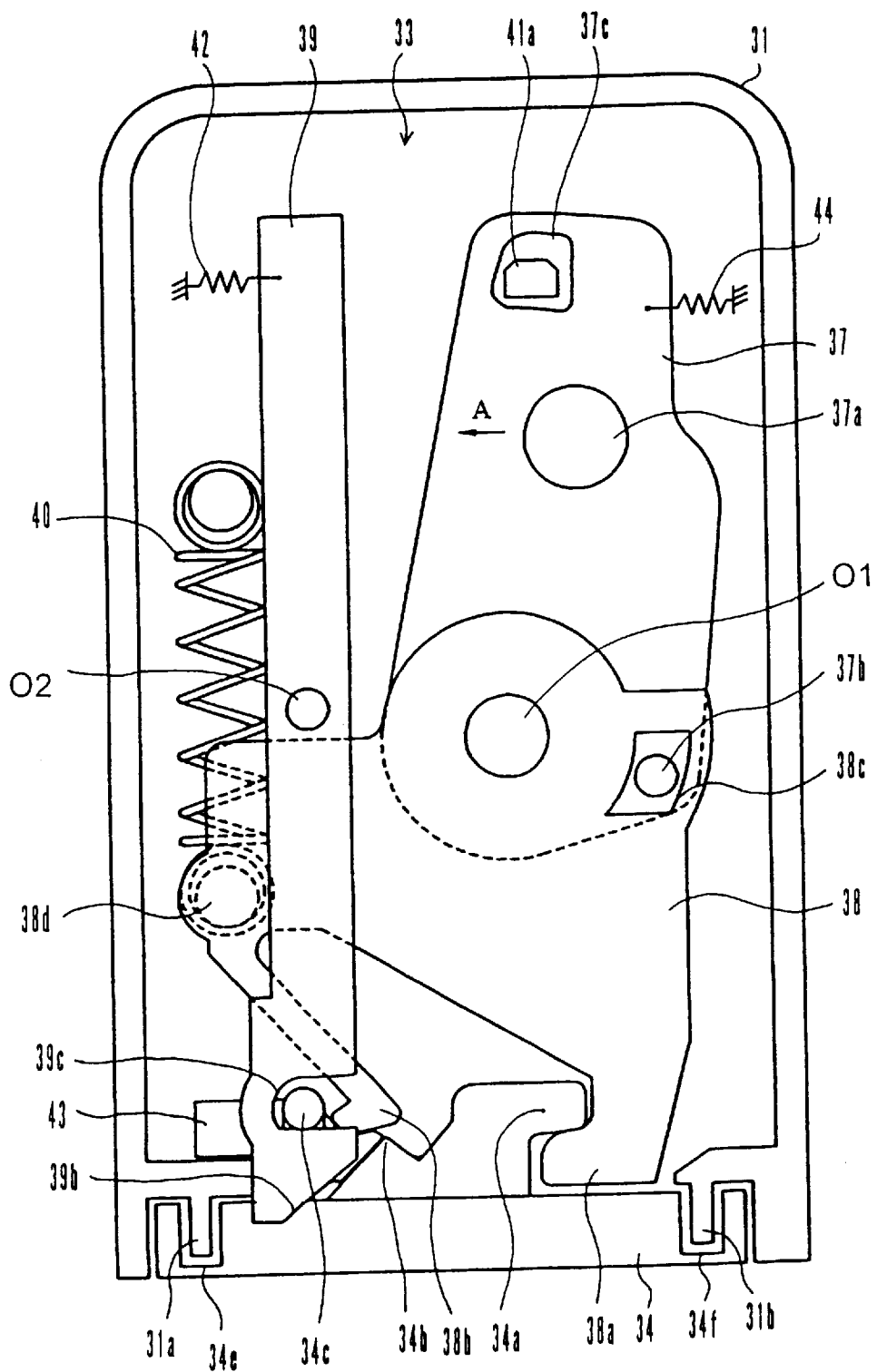
FIG. 7 is a sectional view of the camera showing in FIG. 6, taken in a plane shown by the arrows I—I in FIG. 6.
Figure 8:
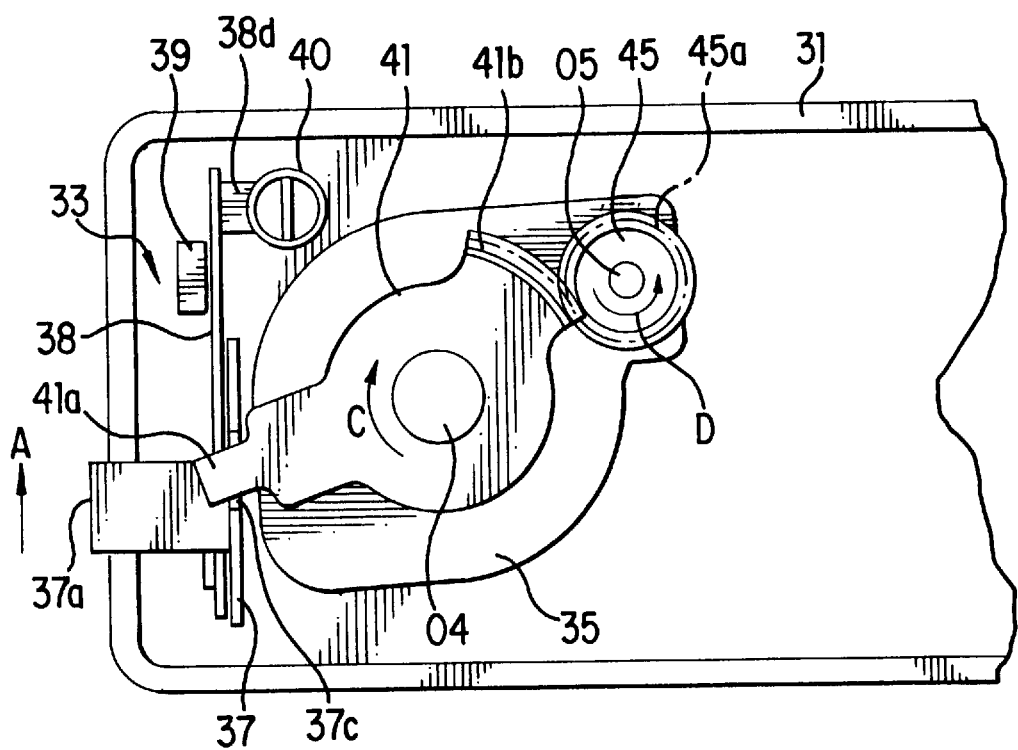
FIG. 8 is a sectional view of the camera showing in FIG. 6, taken in a plane shown by the arrows II—II in FIG. 6.

The details of this fifth preferred embodiment of the present invention will be described hereinafter. FIGS. 6, 7, and 8 are figures showing these fifth preferred embodiment details. In these figures, FIG. 7 is a sectional view of the camera shown in FIG. 6 taken in a plane shown by the arrows I—I, and FIG. 8 is a sectional view of the camera shown in FIG. 6 taken in a plane shown by the arrows II—II; and these figures show the construction with the cartridge chamber lid 34 in its closed state. As shown in FIGS. 6, 7, and 8, a light cutoff door opening and closing mechanism is for opening and closing a light cutoff door of a film cartridge 20 in conjunction with the operation of the film cartridge chamber lid opening and closing mechanism 33, and comprises an operation plate 37 for performing opening operation of the cartridge chamber lid 34 and opening and closing operation of the light cutoff door of the film cartridge 20, a key plate 38 for opening and closing the cartridge chamber lid 34 together with the operation of the operation plate 37, a supplementary member 39 for transmitting the force which is required for closing the cartridge chamber lid 34 to a light cutoff coordinating plate 41 which will be described hereinafter and for supplementing the opening operation for the light cutoff door of the film cartridge 20, a light cutoff door fork 45 which is engaged with an engagement element 20a for the light cutoff door of the film cartridge 20 (when such a film cartridge 20 is loaded into the cartridge chamber 35) for opening and closing this light cutoff door by rotating it, and the abovementioned light cutoff coordinating plate 41 which is engaged with the light cutoff door fork 45 and the operation plate 37 and which rotates the light cutoff door fork 45 by driving the operation plate 37.

The operation plate 37 is supported so as to be rotatable around the axis O1, and, along with driving the light cutoff coordinating plate 41 so as to rotate the light cutoff door fork 45, has the function of rotating the key plate 38 so as to open the cartridge chamber lid 34. Upon the operation plate 37 there are formed an operation portion 37a which projects to the exterior of the cover 31 of the camera so that the operation plate 37 can be operated, a projecting portion 37b which is linked with an engagement hole 38c of the key plate 38 for driving the key plate 38 together with the operation of the operation plate 37, and a cutout hole 37c for engaging with an engagement portion 41a of the light cutoff coordinating plate 41. Further, the operation plate 37 is biased by a spring 44 in the clockwise rotational direction around the axis O1 as shown in FIG. 9.

Figure 9:
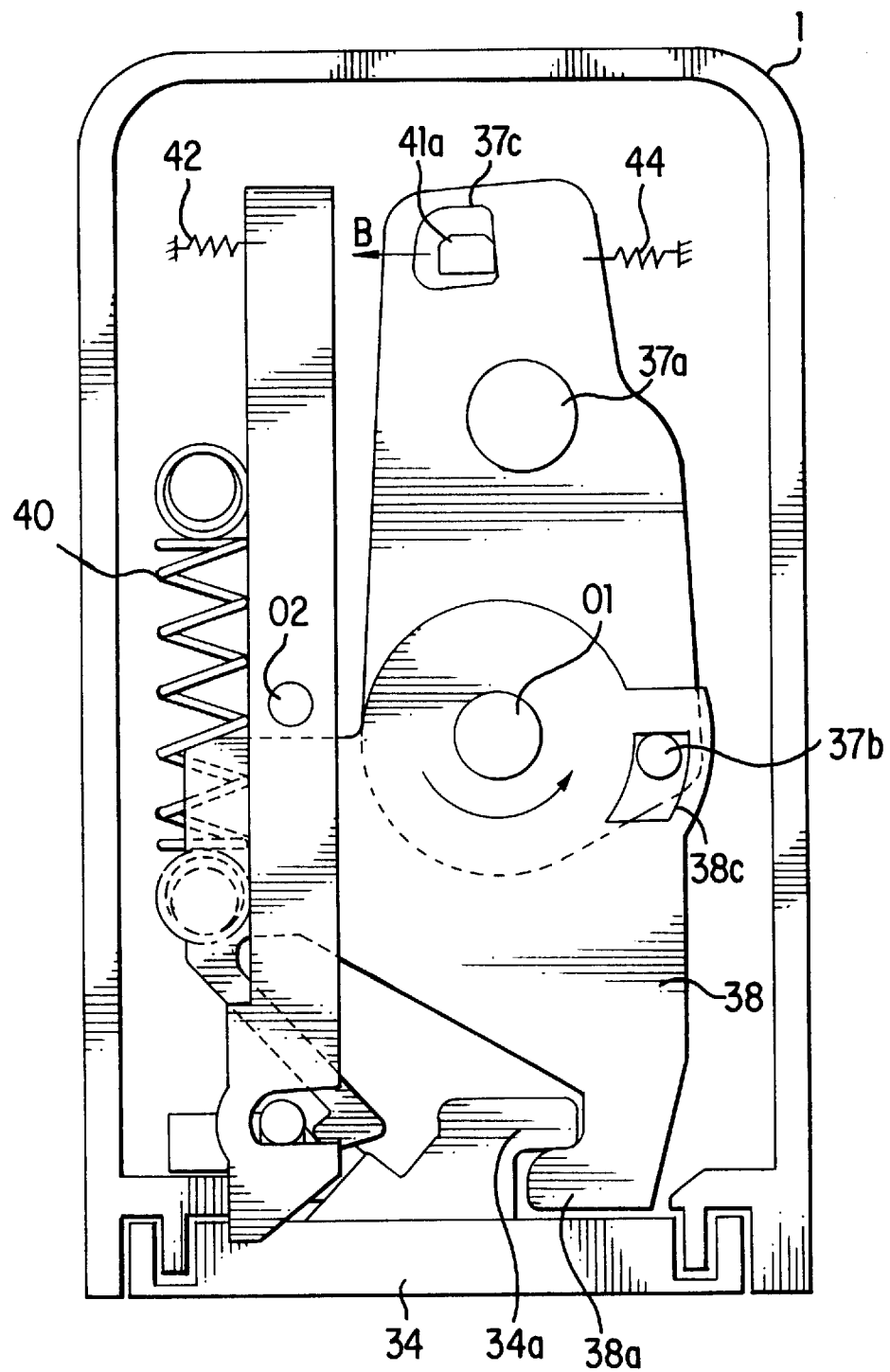
FIG. 9 is a figure for explaining the operation of opening the cartridge chamber lid.

In the same manner as with the operation plate 37, in the key plate 38, which is supported so as to be rotatable around the axis O1, there are formed a key portion 38a which is engaged with a key portion 34a of the cartridge chamber lid 34 when this cartridge chamber lid 34 is closed, a spring portion 38b for fixing the key plate 38 to the main body of the camera so that it cannot rotate when the cartridge chamber lid 34 is opened, an engagement hole 38c which is engaged to the projecting portion 37b of the operation plate 37, and a projecting portion 38d for fixing to the key plate 38 a torsion spring 40 which biases the key plate 38 in the clockwise rotational direction as shown in FIG. 9.

In the supplementary member 39, which is supported so as to be rotatable around the axis O2, there are formed a sloping face 39b for transmitting the force for closing the cartridge chamber lid 34 when the cartridge chamber lid 34 is to be closed to the engagement portion 41a of the abovementioned light cutoff coordinating plate 41, a groove 39c for releasing the projecting portion 34c which is formed on the cartridge chamber lid 34, and a sloping face 39a for facilitating the release of the projecting portion 34c which is engaged with the groove 39c from the groove 39c when the cartridge chamber lid 34 is to be opened. Further, the supplementary member 39 is biased by a spring 42 in the anticlockwise rotational direction as shown in FIG. 8 around the axis O2.

The light cutoff coordinating plate 41 is disposed in the upper portion of the cartridge chamber 35 and is supported so as to be rotatable around an axis O4, and this light cutoff coordinating plate 41 is formed with an engagement portion 41a which is engaged with the cutout hole 37c of the above described operation plate 37, and with a gear 41b which is meshed with a gear portion 45a of the light cutoff door fork 45.

This light cutoff door fork 45 is disposed in the upper portion of the cartridge chamber 35 along with the light cutoff coordinating plate 41 and is supported so as to be rotatable around an axis O5, and is made up from the abovementioned gear portion 45a which is meshed with the gear 41b of the light cutoff coordinating plate 41, and with a fork portion 45b which is engaged with a door engagement portion 20a of the film cartridge 20, when this film cartridge 20 has loaded into the cartridge chamber 35.

Further, concave grooves 34e and 34f are formed in the cartridge chamber lid 34, while cooperating convex ridges 31a and 31b are formed in the cover 31; and, when the cartridge chamber lid 34 is opened, a light cutoff construction is defined by the grooves 34e and 34f and the ridges 31a and 31b which cuts off light from entering the cartridge chamber 35 until the light cutoff door of the film cartridge is perfectly closed. In the state in which the cartridge chamber lid 34 is closed, the ridges 31a and 31b are in the state of being fitted into the respective grooves 34e and 34f. Further, there are provided in the cartridge chamber lid 34 a cartridge support member 51 and a spring 52 for biasing the film cartridge 20 in the upwards direction so that the fork portion 45b engages with the door engagement portion 20a of the film cartridge 20, when the film cartridge 20 has been inserted into the cartridge chamber 35.

The operation of this fifth preferred embodiment of the present invention will be explained hereinafter. First, the operation for opening the cartridge chamber lid 34 will be explained. The above described FIGS. 6, 7, and 8 show the situation when the cartridge chamber lid 34 is closed. In order to open the cartridge chamber lid 34 from this state, the operation plate 37 is rotated in the anticlockwise rotational direction by moving the operation portion 37a provided upon this operation plate 37 in the direction shown by the arrow A in FIG. 7 against the biasing force of the spring 44.

FIG. 9 is a figure showing the situation when from the situation shown in FIG. 7 the operation portion 37a has been operated so as to rotate the operation plate 37 a small amount in the anticlockwise rotational direction. When the operation plate 37 is rotated from its condition shown in FIG. 7, first the right side end face as shown in FIG. 9 of the cutout hole 37c comes into contact with the right side end face of the engagement portion 41a of the light cutoff coordinating plate 41, whereby the engagement portion 41a is driven in the direction shown by the arrow B in the figure. And next, when the operation of the operation portion 37a is continued, the projecting portion 37b of the operation plate 37 comes into contact with the upper side end face as seen in FIG. 9 of the engagement hole 38c. And accordingly, the operation plate 37 and the key plate 38 move as one body, and are rotated by the operation of the operation plate 37 in the direction shown in the figure by the arrow E around the axis O1 against the biasing force of the spring 40 and of the spring 44.

Figure 10:
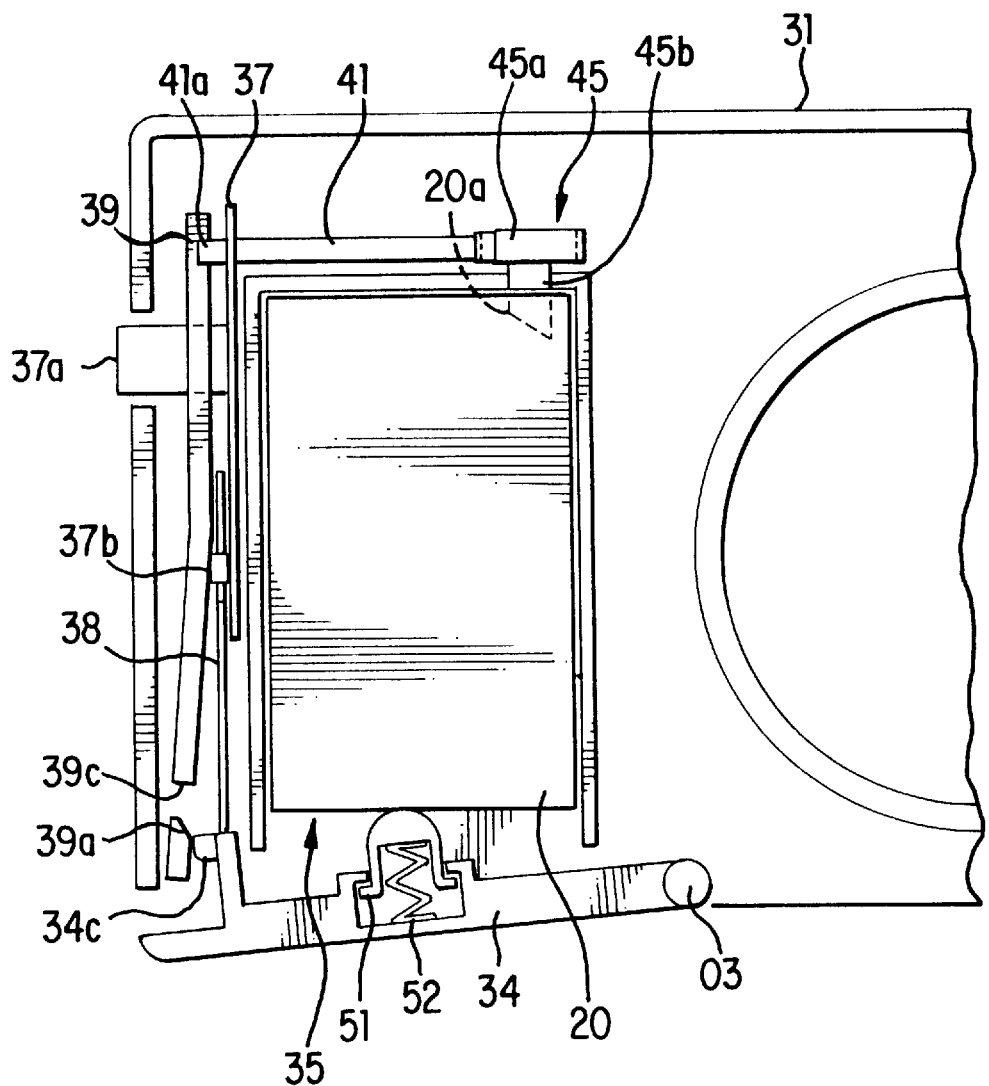
FIG. 10 is a figure for explaining the operation of opening the cartridge chamber lid.

FIG. 10 is a figure showing the situation when the operation plate 37 has been rotated further by the operation of the operation portion 37a from the state shown in FIG. 9. When the operation plate 37 is rotated further against the resistance of the biasing force of the spring 44 from the state shown in FIG. 9, then the light cutoff coordinating plate 41 is rotated by the engagement between the cutout hole 37c and the engagement portion 41a in the direction shown by the arrow C in FIG. 8 around the axis O4, and the light cutoff door fork 45 is rotated in the direction shown by the arrow D in the figure around the axis O5, whereby the light cutoff door 21 of the film cartridge 20 is rotated in the closing direction. On the other hand, the key plate 38 is rotated by the engagement between the projecting portion 37b and the engagement hole 38c in the direction shown by the arrow E in FIG. 9 against the resistance of the biasing force of the spring 40, and thereby the engagement between the key portion 38a of the key plate 38 and the key portion 34a of the cartridge chamber lid 34 is broken. Furthermore, the projecting portion 34c of the cartridge chamber lid 34 is brought into contact with the sloping face 39a of the supplementary member 39 by the rotation of the cartridge chamber lid 34 around the axis O3 in the figure, and thereby the supplementary member 39 is deformed, so that the projecting portion 34c is removed from the groove 39c. Moreover, although in this state the ridges 31a and 31b of the cover 31 are respectively removed from the grooves 34e and 34f of the cartridge chamber lid 34, since they are not completely thus removed, light is still cut off from entering into the cartridge chamber 35. Further, since in the state shown in FIG. 10 the cartridge support member 51 biases the film cartridge 20 in the upwards direction in the figure via the spring 52, the engagement between the door engagement projection 20a and the fork portion 45b is not broken.

Figure 11:
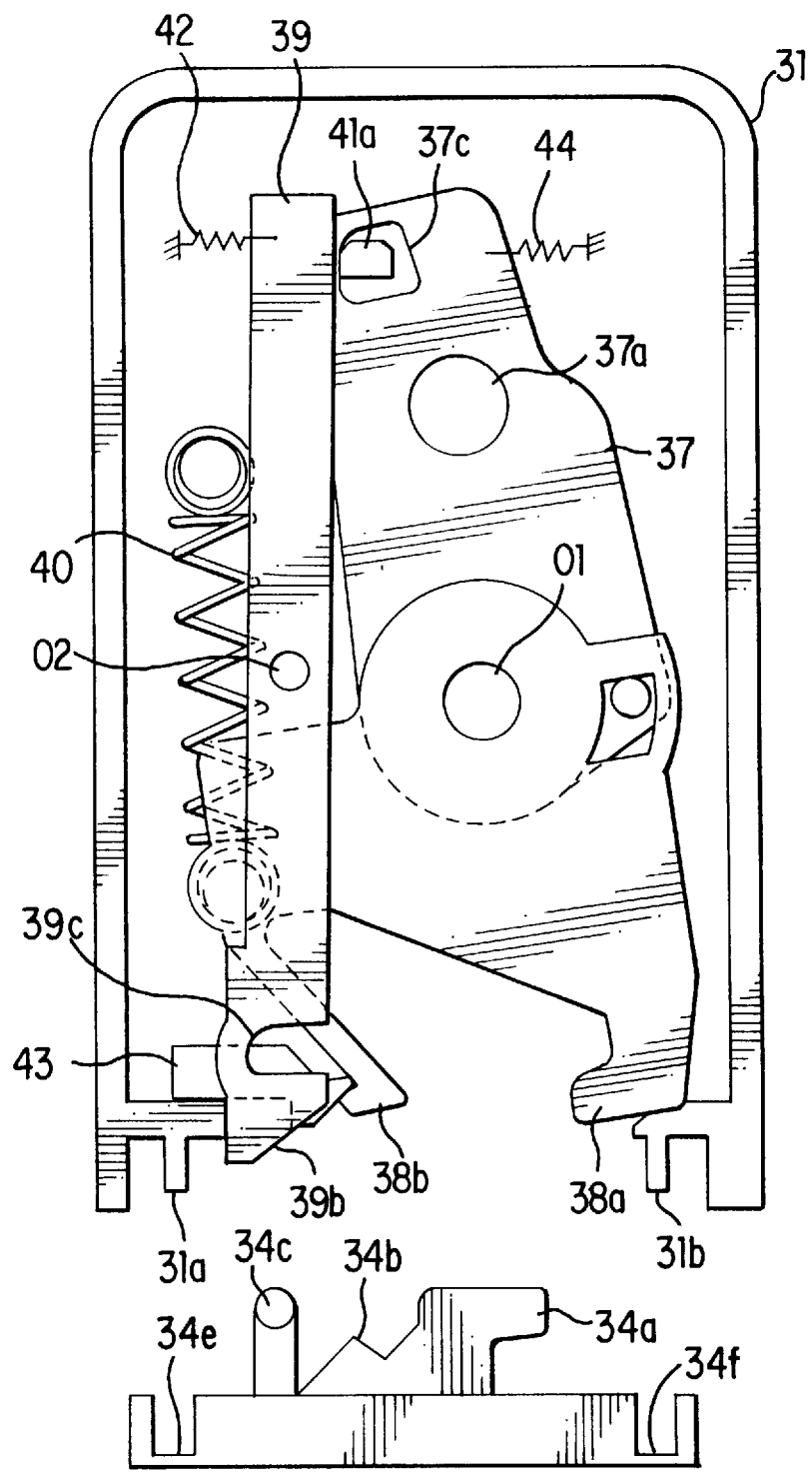
FIG. 11 is a figure showing the condition in which the cartridge chamber lid is completely open.
Figure 12:
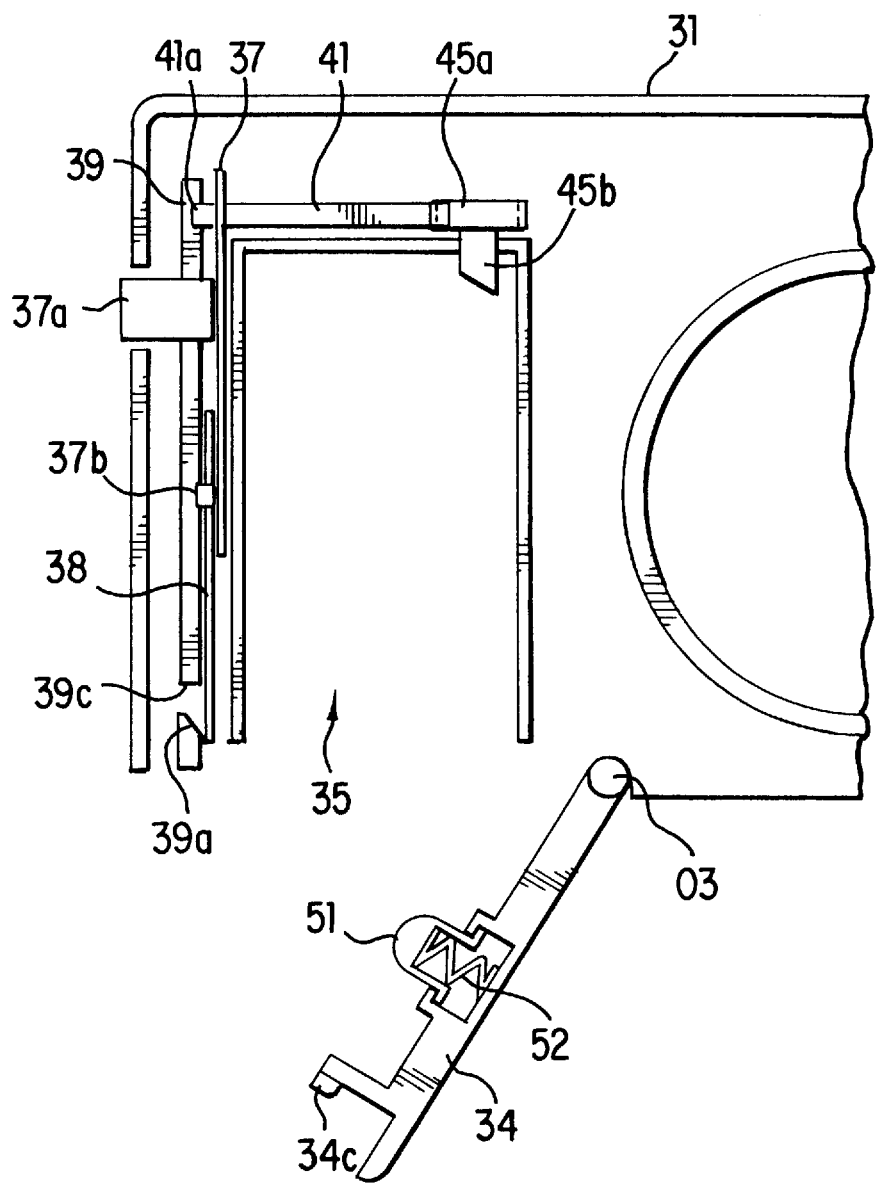
FIG. 12 is another figure showing the condition in which the cartridge chamber lid is completely open.
Figure 13:
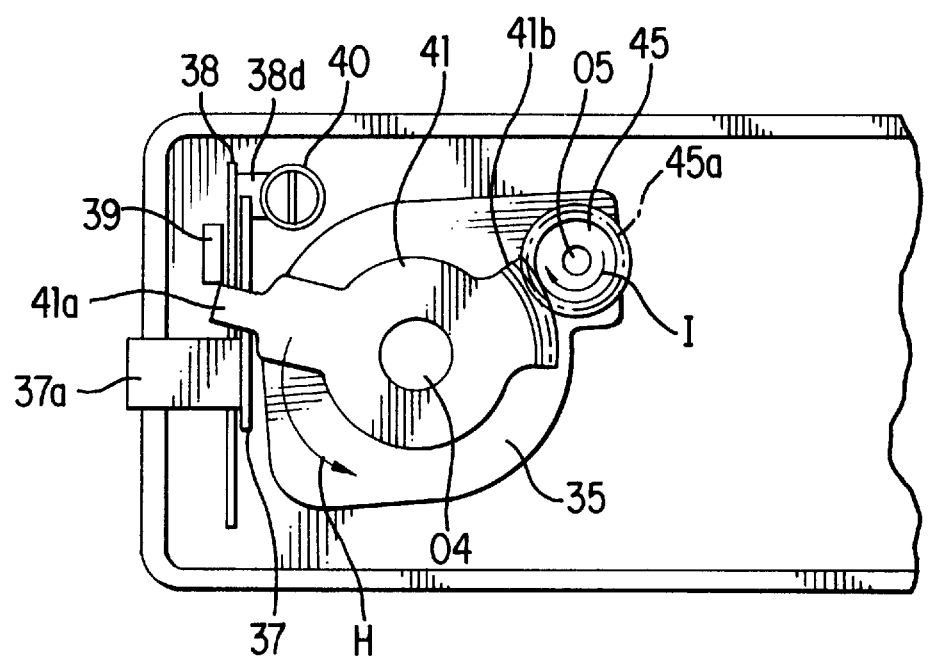
FIG. 13 is yet another figure showing the condition in which the cartridge chamber lid is completely open.

FIGS. 11, 12, and 13 are figures showing the situation when the operation plate 37 has been further rotated from the position shown in FIG. 10. When operation plate 37 is further rotated from the position shown in FIG. 10, the light cutoff coordinating plate 41 is further rotated around the axis O4, and by this the light cutoff door fork 45 is further rotated around the axis O5, and the light cutoff door of the film cartridge 20 is completely closed. On the other hand, the key plate 38 is also rotated further around the axis O1, and the spring portion 37b of the key plate 38 is engaged with the stop portion 43 which is formed upon the main body of the camera. According to this engagement, the key plate 38 is stopped by the main body of the camera, and also the engagement between the key portion 34a of the cartridge chamber lid 34 and the key portion 38a of the key plate 38 is broken, so that the cartridge chamber lid 34 is completely opened. Moreover, in the state where the cartridge chamber lid 34 is completely opened as shown in FIG. 12, the supplementary member 39 returns from its deformed state to its original state. And in this state the film cartridge 20 may be removed from the cartridge chamber 35.

In the above constitution, the amount of force during the cartridge chamber lid 34 is driven to be opened, is required as follows. In detail: until the hole portion 37c and the engagement portion 41a come into contact, the amount of force required is that which can successfully overcome the resistance of the spring 44; subsequently, until the projecting portion 37b and the engagement hole portion 38c come into contact, the amount of force required is that which can successfully overcome the resistance of the spring 44 and the resistance of the engagement portion 41a; and subsequently, until the spring portion 38b is stopped by the stop portion 43, the amount of force required is that which can successfully overcome the resistance of the spring 44, the resistance of the engagement portion 41a, and the resistance of the spring 40.

Figure 14:
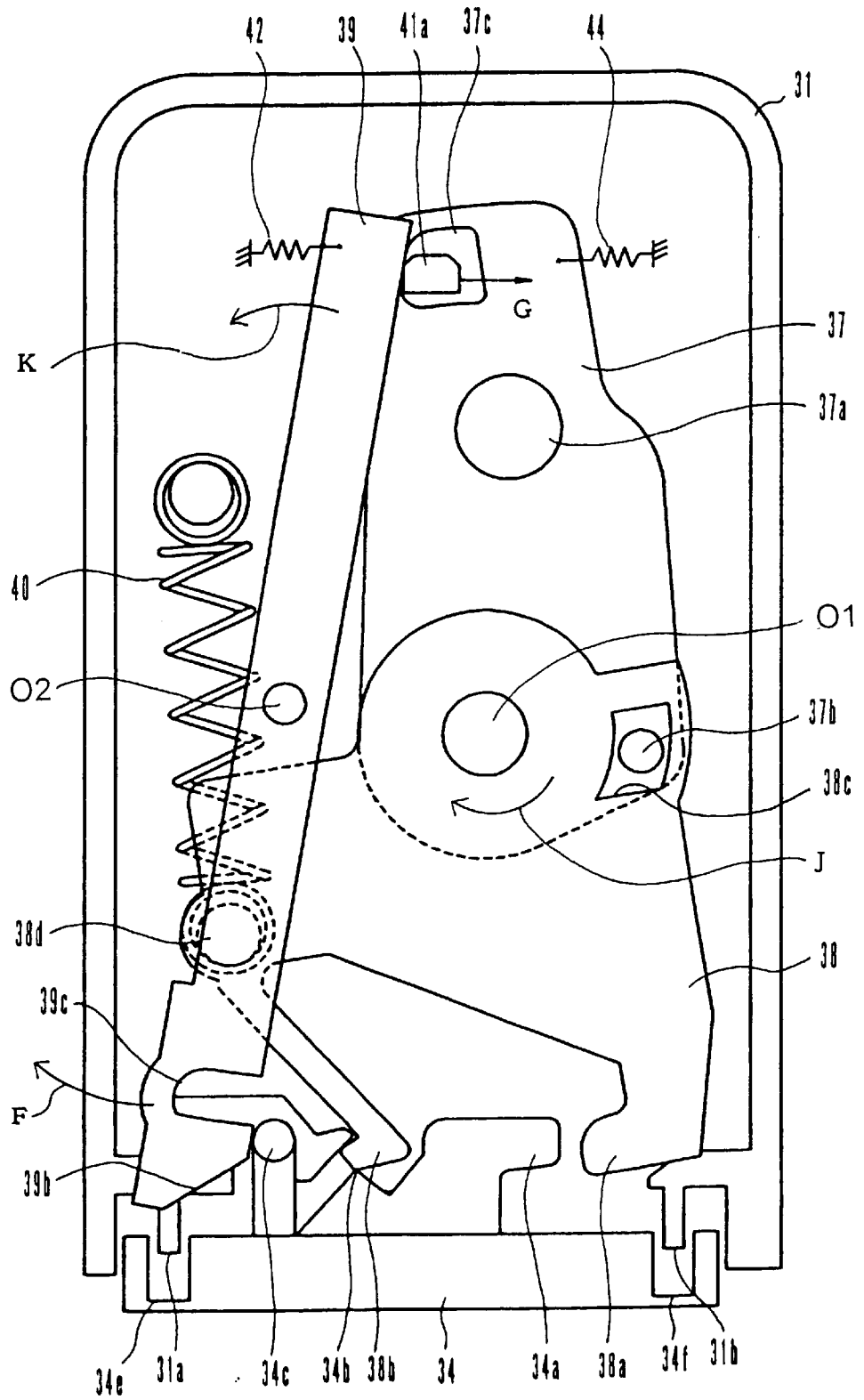
FIG. 14 is a figure for showing the operation of closing the cartridge chamber lid.

The operation for closing the cartridge chamber lid 34 will be described hereinafter. FIG. 14 is a figure showing the state in which the cartridge chamber lid 34 is closed. When the cartridge chamber lid 34 is to be closed from the state shown in FIGS. 11, 12, and 13, first the projecting portion 34c of the cartridge chamber lid 34 and the sloping face 39b of the supplementary member 39 are contacted, and thereby the supplementary member 39 axis is rotated in the direction shown in the figure by the arrow F around the axis O2 against the biasing resistance of the spring 42. While the supplementary member 39 is rotating it comes into contact with the engagement portion 41a of the light cutoff coordinating plate 41, and thereby the engagement portion 41a is moved in the direction shown by the arrow G in FIG. 14. And the light cutoff coordinating plate 41 is thereby rotated in the direction shown in FIG. 13 by the arrow H. When the light cutoff coordinating plate 41 is rotated in the direction shown by the arrow H, the light cutoff door fork 45 is rotated in the direction shown by the arrow I in FIG. 13, and the light cutoff door of the film cartridge 20 is opened. Moreover, since in this state the ridges 31a and 31b of the cover 31 are respectively engaged into the grooves 34e and 34f of the cartridge chamber lid 34, whereby light is positively prevented from entering into the cartridge chamber 35.

When the cartridge chamber lid 34 is closed further, a corner portion 34b of the cartridge chamber lid 34 comes into contact with the spring portion 38b of the key plate 38, and the spring portion 38b is pushed in the upwards direction so that it is removed from its engagement with the stop portion 43. When the cartridge chamber lid 34 is closed yet further, the stopping between the spring portion 38b of the key plate 38 and the stop portion 43 is released, and the key plate 38 is rotated by the return force of the spring 40 around the axis O1 in the direction shown in the figure by the arrow J. And thereby, the projecting portion 37b of the operation plate 37 comes into contact with the lower end face of the engagement hole 38c, and the operation plate 37 is rotated in the direction shown in the figure by the arrow J by the biasing force of the spring 44 as well. When the operation plate 37 is rotated in the direction shown in the figure by the arrow J, the engagement portion 41a comes into contact with the left end face of the hole portion 37c, and the engagement portion 41a is shifted further in the direction shown by the arrow G in the figure. And the light cutoff coordinating plate 41 is further rotated in the direction shown by the arrow H in FIG. 13, so that the light cutoff door fork 45 is rotated in the direction shown in the figure by the arrow I. And by this the light cutoff door of the film cartridge 20 is opened further. On the other hand, when the key plate 38 is rotated in the direction shown by the arrow J and the cartridge chamber lid 34 is further closed, the key portion 34a of the cartridge chamber lid 34 and the key portion 38a of the key plate 38 are engaged together, and the supplementary member 39 is rotated by the biasing force of the spring 42 in the direction shown in the figure by the arrow K, so that the projecting portion 34c is engaged with the groove 39c of the supplementary member 39. Along with this, the ridges 31a and 31b of the cover 31 are engaged with the grooves 34e and 34f of the cartridge chamber lid 34, so that the cartridge chamber lid 34 is completely closed and light is perfectly prevented from intruding thereinto. Meanwhile the light cutoff door of the film cartridge 20 is completely opened by the rotation of the light cutoff door fork 45.

The force required for driving the light cutoff coordinating plate 41 when the cartridge chamber lid 34 is to be closed is supplied from not only the spring 40 as described above but also from the cartridge chamber lid 34 via the supplementary member 39. Accordingly, the force of the spring 40 for driving the light cutoff coordinating plate 41 when the cartridge chamber lid 34 is to be closed can be made smaller just by the supplementary amount for the cartridge chamber lid 34. This makes it possible to reduce the amount of force for operating the operation portion 37a of the operation plate 37 when opening the cartridge chamber lid 34.

Further, since the operation plate 37 and the key plate 38 are constructed as separate members, and it is arranged that the key plate 38 is rotated after the start of the operation of the operation plate 37, whereby, when the film cartridge 20 is to be removed from the cartridge chamber 35, the light cutoff door of the film cartridge 20 is closed before the engagement between the key portion 34a of the cartridge chamber lid 34 and the key portion 38a of the key plate 38 is broken. And, accordingly, there is no risk of exposing the film to light when removing the film cartridge 20 from the camera.

Although the construction according to the fifth embodiment of the present invention provided for the light cutoff coordinating plate 41 and the light cutoff door fork 45 to be driven by the operation plate 37, the key plate 38, and the supplementary member 39, the present invention is not to be considered as being limited by this purely exemplary feature of the construction; it would also be possible, as an alternative, without departing from the principles of the present invention, to utilize means for directly driving the light cutoff coordinating plate 41 by the opening and closing operation of the cartridge chamber lid 34, without interposing the operation plate 37 or the key plate 38. Further, although in the construction according to the shown preferred embodiment the means such as the operation plate 37, the key plate 38, the supplementary member 39 and so on were provided within the main body of the camera, it would also be acceptable, as an alternative, to provide means such as for driving the light cutoff coordinating plate 41 to the cartridge chamber lid 34. Yet further, although in the shown preferred embodiment the driving of the light cutoff coordinating plate 41 and the light cutoff door fork 45 was supplemented during the operation of closing the cartridge chamber lid 34 by using the supplementary member 39, it would also be possible, as an alternative, to arrange the construction so that it did not include any such supplementary member 39. Accordingly, although the present invention has been shown and described in terms of several preferred embodiments thereof, it is not to be considered as limited by any of the perhaps quite fortuitous details of said embodiments or of the drawings, but only by the terms of the appended claims, which follow.

We claim:

1. A camera equipped with a light cutoff door opening and closing mechanism, comprising:
   a cartridge chamber into which a film cartridge which comprises a light cutoff door is loaded;
   a cartridge chamber lid which is selectively opened and closed, so as respectively to communicate said cartridge chamber to the exterior or to isolate said cartridge chamber from external light;
   and a door opening and closing mechanism which converts closing operation force of said cartridge chamber lid to opening driving force of said light cutoff door so as to open said light cutoff door, after said cartridge chamber has been isolated from external light by closing operation of said cartridge chamber lid.

2. A camera equipped with a light cutoff door opening and closing mechanism according to claim 1, wherein said door opening and closing mechanism comprises an energy storage mechanism which is charged with said opening driving force by movement of said cartridge chamber lid from the start of the closing operation of said cartridge chamber lid until said cartridge chamber lid has isolated said cartridge chamber from external light, and said opening driving force of said energy storage mechanism is exerted upon said light cutoff door after said cartridge chamber lid has isolated said cartridge chamber from external light.

3. A camera equipped with a light cutoff door opening and closing mechanism according to claim 1, wherein said door opening and closing mechanism comprises an energy storage mechanism which is charged with closing driving force for said light cutoff door by closing operation of said cartridge chamber lid, and said closing driving force of said energy storage mechanism is exerted upon said light cutoff door before light blocking for said cartridge chamber has been terminated by opening operation of said cartridge chamber lid.

4. A camera equipped with a light cutoff door opening and closing mechanism according to claim 2, wherein said door opening and closing mechanism comprises an energy storage mechanism which is charged with closing driving force for said light cutoff door by closing operation of said cartridge chamber lid, and said closing driving force of said energy storage mechanism is exerted upon said light cutoff door before light-blocking for said cartridge chamber has been terminated by opening operation of said cartridge chamber lid.

5. A camera equipped with a light cutoff door opening and closing mechanism, comprising:

a cartridge chamber into which a film cartridge which comprises a light cutoff door is loaded;

a cartridge chamber lid which is selectively opened and closed, so as respectively to communicate said cartridge chamber to the exterior or to isolate said cartridge chamber from external light, and which is locked in its closed position;

an operation member which is operated to open said cartridge chamber lid;

and a timing mechanism which, in solely mechanical response to said operation of said operation member to open said cartridge chamber lid, releases the closed lock of said cartridge chamber lid after said light cutoff door has been closed.

6. A camera equipped with a light cutoff door opening and closing mechanism according to claim 5, wherein said timing mechanism comprises an energy storage mechanism which is charged with closing driving force for said light cutoff door by closing operation of said cartridge chamber lid, and said closing driving force of said energy storage mechanism is exerted upon said light cutoff door before light-blocking of said cartridge chamber has been terminated by opening operation of said cartridge chamber lid.

7. A camera equipped with a light cutoff door opening and closing mechanism, comprising:

a cartridge chamber into which a film cartridge which comprises a light cutoff door is loaded;

a cartridge chamber lid which is selectively opened and closed, so as respectively to communicate said cartridge chamber to the exterior or to isolate said cartridge chamber from external light;

and a light cutoff door opening mechanism which is charged with opening driving force for said light cutoff door by initial closing operation of said cartridge chamber lid, said light cutoff door opening mechanism opening said light cutoff door by said opening driving force in response to final closing operation of said cartridge chamber lid.

8. A camera equipped with a light cutoff door opening and closing mechanism, comprising:

a cartridge chamber into which a film cartridge which comprises a light cutoff door is loaded;

a cartridge chamber lid which is selectively opened and closed, so as respectively to communicate said cartridge chamber to the exterior or to isolate said cartridge chamber from external light;

and an energy storage mechanism which is charged with solely mechanically closing driving force for said light cutoff door by closing operation of said cartridge chamber lid.

9. A camera equipped with a light cutoff door opening and closing mechanism, comprising:

a cartridge chamber into which a film cartridge which comprises a light cutoff door is loaded;

a cartridge chamber lid which is selectively opened and closed, so as respectively to communicate said cartridge chamber to the exterior or to isolate said cartridge chamber from external light;

and an energy storage mechanism which is charged with solely mechanically opening driving force and also with solely mechanically closing driving force for said light cutoff door by closing operation of said cartridge chamber lid.

10. A camera equipped with a light cutoff door opening and closing mechanism, comprising:

a cartridge chamber into which a film cartridge which comprises a light cutoff door is loaded;

a cartridge chamber lid which is selectively opened and closed, so as respectively to communicate said cartridge chamber to the exterior or to isolate said cartridge chamber from external light;

and an energy storage mechanism which is charged with solely mechanically opening driving force for said light cutoff door by opening operation of said cartridge chamber lid.

11. A camera equipped with a light cutoff door opening and closing mechanism, comprising:

a cartridge chamber into which a film cartridge which comprises a light cutoff door is loaded;

a cartridge chamber lid which is selectively opened and closed, so as respectively to communicate said cartridge chamber to the exterior or to isolate said cartridge chamber from external light;

and an energy storage mechanism which is charged with solely mechanically closing driving force for said light cutoff door by opening operation of said cartridge chamber lid.

12. A camera equipped with a light cutoff door opening and closing mechanism, comprising:

a cartridge chamber into which a film cartridge which comprises a light cutoff door is loaded;

a cartridge chamber lid which is selectively opened and closed, so as respectively to communicate said cartridge chamber to the exterior or to isolate said cartridge chamber from external light;

and an energy storage mechanism which is charged with solely mechanically opening driving force and also with solely mechanically closing driving force for said light cutoff door by opening operation of said cartridge chamber lid.

13. A camera equipped with a light cutoff door opening and closing mechanism, comprising:

a cartridge chamber into which a film cartridge which comprises a light cutoff door is loaded;

a cartridge chamber lid which is selectively opened and closed, so as respectively to communicate said cartridge chamber to the exterior or to isolate said cartridge chamber from external light;

and a door opening and closing mechanism which converts closing operation of said cartridge chamber lid to opening operation of said light cutoff door in mechanical response to said closing operation of said cartridge chamber lid, and converts opening operation of said cartridge chamber lid to closing operation of said light cutoff door in mechanical response to said opening operation of said cartridge chamber lid.

14. A camera equipped with a light cutoff door opening and closing mechanism according to claim 13, further comprising a light-blocking member which cuts off light from said cartridge chamber until said cartridge chamber lid has been operated to open for a predetermined amount, and wherein said door opening and closing mechanism completely closes said light cutoff door through the opening operation of said cartridge chamber lid before the light cutoff by said light-blocking member is canceled.

15. A camera equipped with a light cutoff door opening and closing mechanism according to claim 14, further comprising a supplementary member which supplements the driving of said light cutoff door opening and closing mechanism together with the closing operation of said cartridge chamber lid.

16. A camera equipped with a light cutoff door opening and closing mechanism according to claim 14, wherein said light cutoff door opening and closing mechanism comprises an engagement member which engages said cartridge chamber lid to a main body of said camera, and a drive member which is driven in response to engagement operation and release operation of said engagement member.

17. A camera equipped with a light cutoff door opening and closing mechanism, according to claim 13 further comprising a light-blocking member which cuts off light from said cartridge chamber after said cartridge chamber lid has been operated to close for a predetermined amount, and wherein said door opening and closing mechanism completely opens said light cutoff door through the closing operation of said cartridge chamber lid after the light cutoff by said light-blocking member is begun.

18. A camera equipped with a light cutoff door opening and closing mechanism according to claim 17, wherein said light cutoff door opening and closing mechanism comprises an engagement member which engages said cartridge chamber lid to a main body of said camera, and a drive member which is driven in response to engagement operation and release operation of said engagement member.

19. A camera equipped with a light cutoff door opening and closing mechanism according to claim 13, further comprising a supplementary member which supplements the driving of said light cutoff door opening and closing mechanism together with the closing operation of said cartridge chamber lid.

20. A camera equipped with a light cutoff door opening and closing mechanism according to claim 13, wherein said light cutoff door opening and closing mechanism comprises an engagement member which engages said cartridge chamber lid to a main body of said camera, and a drive member which is driven in response to engagement operation and release operation of said engagement member.

* * * * *